United States Patent [19]

Aurich et al.

[11] Patent Number: 5,235,828
[45] Date of Patent: Aug. 17, 1993

[54] APPARATUS FOR LOW LIQUID WET TREATMENT OF A TEXTILE MATERIAL

[75] Inventors: Christoph W. Aurich, Clemson, S.C.; Charles R. Hornbuckle, Lincolnton; William C. Sturkey, Charlotte, both of N.C.

[73] Assignee: Gaston County Dyeing Machine Co., Stanley, N.C.

[21] Appl. No.: 757,007

[22] Filed: Sep. 9, 1991

[51] Int. Cl.$^5$ .......................... D06F 1/02; D06F 1/10; D06F 3/28

[52] U.S. Cl. ......................................... 68/62; 68/158; 68/177; 68/205 R; 226/158

[58] Field of Search ................... 68/62, 158, 159, 177, 68/178, 205 R; 226/158

[56] References Cited

U.S. PATENT DOCUMENTS

| | | |
|---|---|---|
| 251,833 | 1/1882 | Clough . |
| 256,057 | 4/1882 | Sargent et al. ............... 68/158 X |
| 293,789 | 2/1884 | Sargent . |
| 784,240 | 3/1905 | Tillinghast . |
| 4,644,765 | 2/1987 | Kito ............................. 68/62 |
| 4,754,621 | 7/1988 | Hikosaka ..................... 68/152 |

Primary Examiner—Philip R. Coe
Attorney, Agent, or Firm—Shefte, Pinckney & Sawyer

[57] ABSTRACT

Apparatus for low liquid wet treatment of a textile material in various forms, such as lengths of fabric in rope form or yarn in skein form, through a treating chamber in the presence of a treatment liquid with the textile material being circulated through a predetermined path of treatment on oscillating support members in the form of parallel beams arranged in rows and caused to oscillate in an alternate manner in which alternate support members are driven through a raised support and movement path wherein the textile material is supported and moved forward thereon while intermediate support members are moved through a lowered return path out of supporting engagement with the textile material. While the textile material is being supported and moved by the support members, treatment liquid is applied by a system of horizontally opposed spray nozzles directed outwardly in a horizontally opposed manner such that the sprays collide, disrupting the spray pattern and causing the treatment liquid to fall as a mist onto the textile material passing thereunder.

35 Claims, 17 Drawing Sheets

APPARATUS FOR LOW LIQUID WET TREATMENT OF A TEXTILE MATERIAL

BACKGROUND OF THE INVENTION

The present invention relates to an apparatus and method for wet treatment of a textile material that is treated utilizing treatment liquid in a treating chamber, and more particularly to such an apparatus and method wherein the textile material is supported and moved during treatment to provide effective treatment at low liquor ratios. The present invention is adaptable for treating textile material in various forms, such as lengths of fabric or yarn in skein form.

Apparatus and methods for treating textile material in cloth rope plug form or in yarn skein form are well-known conventionally. However, typical treating apparatus requires at least partial immersion of the material undergoing treatment in a treating bath not only for treatment by the liquid in the bath, but to facilitate physical movement of the material through the bath. This approach typically yields a satisfactory end product, but provides an inefficient use of resources.

There is a increased need to reduce the liquor ratio to minimize waste liquor and therefore minimize the environmental impact therefrom and to reduce the cost of the treating method. Numerous efforts have been made to minimize the liquor ratios for these reasons.

For example, in Turner et al U.S. Pat. No. 4,716,744, the amount of liquor is minimized to some extent by the use of an overhead spray system for applying liquor to an only partially submerged plug in a cloth rope recirculating system.

Accordingly, a treatment system has not been known where the textile material such as a cloth rope or skeins are supported and moved during treatment wholly without immersion in a bath, so that little or no bath is needed below the material. A continuing particular problem in developing such a machine has been to adequately protect lightweight, delicate fabrics without the protection obtained by immersion in a treating bath. Additional problems encountered with low liquor ratios where the material is not fully immersed is in post-treatment washing. A conventional bath system is relatively inefficient when washing due to clot plug immersion and recirculation of the wash water.

By the present invention, a method and apparatus is provided by which textile material is supported and moved without immersion in a bath, thereby greatly reducing the amount of treating liquor needed for treatment. In addition, the present invention allows "once-through washing" which means the wash water only passes through the apparatus once and as such, the textile material is washed with only clean water. This results in more effective washing and a saving of water as well. In addition, compressed air may be injected with the wash water to provide propulsion assistance to the wash water, thereby further reducing the amount of wash water needed. By the above, the present invention provides an apparatus and method for low liquid level treatment of a textile material which conserves energy and lessens the impact on the environment.

SUMMARY OF THE INVENTION

It is accordingly an object of the present invention to provide gentle handling, low liquor ratio and high-speed operation in treating textile material in a textile dyeing machine by utilizing a unique transport mechanism which moves the material along its path through the treatment chamber with spray means for spraying treatment liquid onto the material in the treatment chamber to expedite treatment along the length of the material and assure uniformity of treatment without immersing the material in a bath. The invention also provides in one embodiment the capability of once-through washing.

The apparatus for low liquid wet treatment of a textile material of the present invention includes a vessel having a treatment chamber for containing the material for application of treatment liquid to the material in the vessel, an arrangement for applying treatment liquid to the material in the treatment chamber, and an assembly for supporting and moving the material in the treatment chamber including a plurality of support members and an assembly for driving the support members in a material supporting and moving path in which the support members support and move the material supported thereon and in a return path below the material supporting and moving path in which the support members move without moving the material, the driving assembly moving some of the members through their material supporting and moving path, while other members are being moved through their return path.

Preferably, the support members are narrow, elongated bars extending in parallel relation in the treatment chamber and are arranged in a row, the driving assembly moving alternate support members through the supporting and moving path while moving intermediate support members through the return path. The driving assembly imparts an oscillating motion to the support members for moving the support members through the supporting and moving path and through the return path and is operable to periodically reverse the direction of movement of the support members in the paths.

The apparatus also includes an arrangement for circulating treatment liquid from the treatment chamber to the arrangement for applying treatment liquid to the material while maintaining a low level of liquid in the bottom of the vessel generally below a level at which the liquid would impede the advancement of the material by the support members. Additionally, the support members include an arrangement for applying the treatment liquid to the material being supported and moved thereon. The arrangement for applying treatment liquid onto the material and the treatment chamber also includes a spray assembly for directing at least a portion of the treatment liquid into the treatment chamber at a plurality of openings within the treatment chamber above the material to apply treatment liquid to the material at a plurality of locations as the material progresses through the treatment chamber, the openings being disposed and shaped for distribution of the treatment liquid across substantially the full width of the material. The aforesaid openings are arranged in pairs, each pair including laterally opposed openings for dispensing liquid in intersecting streams.

The treatment vessel is generally longitudinally extending for travel of the textile material in a predetermined path therethrough and the assembly for supporting and moving the material supports and advances the material through the treatment chamber with the supporting and moving path being an advancing path.

In one form of the preferred embodiment of the present invention, an apparatus for low liquid wet treatment of a textile material in endless rope form includes a generally longitudinally extending vessel for circulating the rope in a predetermined path therethrough, the vessel having a treatment chamber for applying treatment liquid to the rope traveling therethrough, an arrangement for forming the cloth rope into plug form for travel through the treatment chamber in plug form, an arrangement for withdrawing the rope from the plug in the treatment chamber, a rope return conduit for returning the rope from the withdrawal arrangement to the plug forming arrangement, and an arrangement for directing treatment liquid against the rope in the rope return conduit to apply liquid to the rope and to impart a moving force to the rope for travel through the rope return conduit. The apparatus further includes an arrangement for applying treatment liquid to the plug in the treatment chamber and an assembly for supporting and advancing the plug through the treatment chamber, including a plurality of plug support members and an assembly for driving the plug support members through an advancing path in which the plug support members support and advance the plug supported thereon and through a return path below the advancing path in which the plug support members are out of advancing engagement with the plug. The driving assembly moves some of the plug support members through their advancing path while moving other plug support members through their return path. Preferably, the plug support members are inclined slightly upwardly in the direction of plug advance and each plug support member includes a discharge end portion inclined substantially upwardly relative to the adjacent portion of the support member to position the plug at an upward disposition to facilitate withdrawal of the endless rope from the plug by the withdrawal arrangement.

It is further preferred that the arrangement for directing treatment liquid against the rope includes jet means located generally at the entrance of the rope return conduit for applying treatment liquid and imparting a moving force to the rope. The jet means may include an arrangement for applying water to the textile material in rope form to wash the rope and propel the rope through the rope return conduit. The washing arrangement also may include an arrangement for applying air to the rope in conjunction with the water to propel the rope at a sufficient speed for washing while conserving water during washing, thereby allowing a once-through pass of wash water. Additionally, the rope return conduit has an upstream portion and downstream portion extending from the upstream portion at an upward inclination with respect thereto to cause the treating liquid and the cloth rope propelled thereby to spread laterally at the juncture of the portions and thereby present the cloth rope for enhanced plug formation in the plug forming chamber.

It is further preferred that the apparatus include means for circulating the treatment liquid from the treatment chamber to the arrangement for directing treatment liquid against the textile material and to the arrangement for applying treatment liquid to the textile material while maintaining a low level of liquid in the bottom of the vessel generally below a level at which the liquid would impede the advancement by the support members. Preferably, the arrangement for applying treatment liquid includes spray means for directing at least a portion of the treatment liquid into the treatment chamber at a plurality of openings spaced along the length of the chamber intermediate its ends and above the textile material to apply treatment liquid to a plurality of locations as the textile material progresses through the treatment chamber, the openings being disposed and shaped for distribution of the treatment liquid across substantially the full width of the textile material. The openings are preferably arranged in pairs, each pair including laterally opposed openings for dispensing liquid widthwise of the chamber in intersecting streams that disperse the liquid to fall onto the textile material.

The aforementioned rope return conduit may include an opening into the plug forming chamber and an end portion that is movable traversely in an oscillating manner to facilitate plating of the rope substantially uniformly across the plug forming chamber. The rope return conduit also may include a baffle plate disposed at the opening of the return conduit into the plug forming chamber for deflecting the endless rope into the plug forming chamber to control plug formation, the baffle plate being pivotally mounted for pivoting to adjust the deflection of the endless rope.

It is further preferred that the plug forming chamber has a plurality of apertures formed therein for drainage of the treatment liquid therethrough during plug formation and to thereby greatly reduce interference with plug formation. Further, the plug forming chamber includes an outer wall portion extending generally horizontally into the treatment chamber below the rope plug and above the plug support members to direct the rope in plug form onto the plug support members.

It is additionally preferred that the apparatus include means for applying wash water to the textile material to wash the textile material after treatment thereof and to propel the textile material through the treatment chamber during washing thereof, an arrangement for injecting compressed air into the wash water for utilization of compressed air to aid in the propulsion of the textile material through the treatment chamber with a minimum of wash water, and an arrangement for draining wash water from the vessel without recirculation thereof.

In an alternate embodiment of the present invention, the apparatus for low liquid wet treatment of a textile material in skein form includes a vessel having a treatment chamber for applying treatment liquid to the skeins in the vessel, an arrangement for applying treatment liquid to the skeins in the treatment chamber, an assembly for supporting and moving the skeins in the treatment chamber including a plurality of skein support members, and an assembly for driving the skein support members in a skein supporting and moving path in which said skein support members support and move the skeins supported thereon and in a return path below the skein supporting and moving path in which the support members move without moving the skeins, the driving assembly moving some of the support members through their skein supporting and moving path while other members are being moved through their return path. The driving assembly is operable to reverse the direction of movement of the skein support members in the paths to reciprocate the skeins during treatment for enhanced exposure of the yarn to the treating liquid. Further, the skein support members themselves include an arrangement for applying treatment liquid to the skeins being supported and moved thereon. Preferably, the arrangement for applying treatment liquid to the skeins includes hollow interiors in the skein support members for passage of treatment liquid therethrough and a plurality of liquid dispensing openings in the support members facing the skeins supported on the support members to direct the treatment liquid onto the supported skeins.

In an additional embodiment of the present invention, an apparatus for low liquid wet treatment of a textile material includes a generally longitudinally extending vessel for circulating the material in a predetermined path therethrough, the vessel having a treatment chamber for applying treatment liquid to the material traveling therethrough, an arrangement for applying liquid to the material in the treatment chamber, an assembly for applying wash water to the textile material to wash the textile material after treatment thereof and to propel the textile material through the treatment chamber during washing thereof, an arrangement for injecting compressed air into the wash water for utilization of compressed air to aid in the propulsion of the textile material through the treatment chamber with a minimum of wash water, and an arrangement for draining the wash water from the vessel without recirculation thereof.

The present invention additionally includes a method for washing textile material in a vessel having a treatment chamber with the textile material traveling along a predetermined path therethrough. The method comprises applying a stream of water to the textile material traveling through the vessel to wash the textile material and to propel the textile material through the vessel, introducing a stream of compressed air into the water stream to aid in the propulsion of the textile material through the vessel with a minimum of wash water and draining the wash water from the vessel without recirculation thereof.

A further embodiment of the present invention includes an apparatus for low liquid wet treatment of a textile material including a generally longitudinally extending vessel for circulating the material in a predetermined path therethrough, the vessel having a treatment chamber for applying treatment liquid to the material traveling therethrough, a rope return conduit and a plug forming chamber within the treatment chamber, an arrangement for applying liquid to the material in the treatment chamber wherein the rope return conduit has an upstream portion and a downstream portion extending from the upstream portion at an upward inclination with respect thereto to cause the treatment liquid and the material propelled thereby to slow down and thereby spread laterally at the junction of the portions to present the material for enhanced plug formation in the plug forming chamber.

DESCRIPTION OF THE PREFERRED EMBODIMENT

Figure 1:
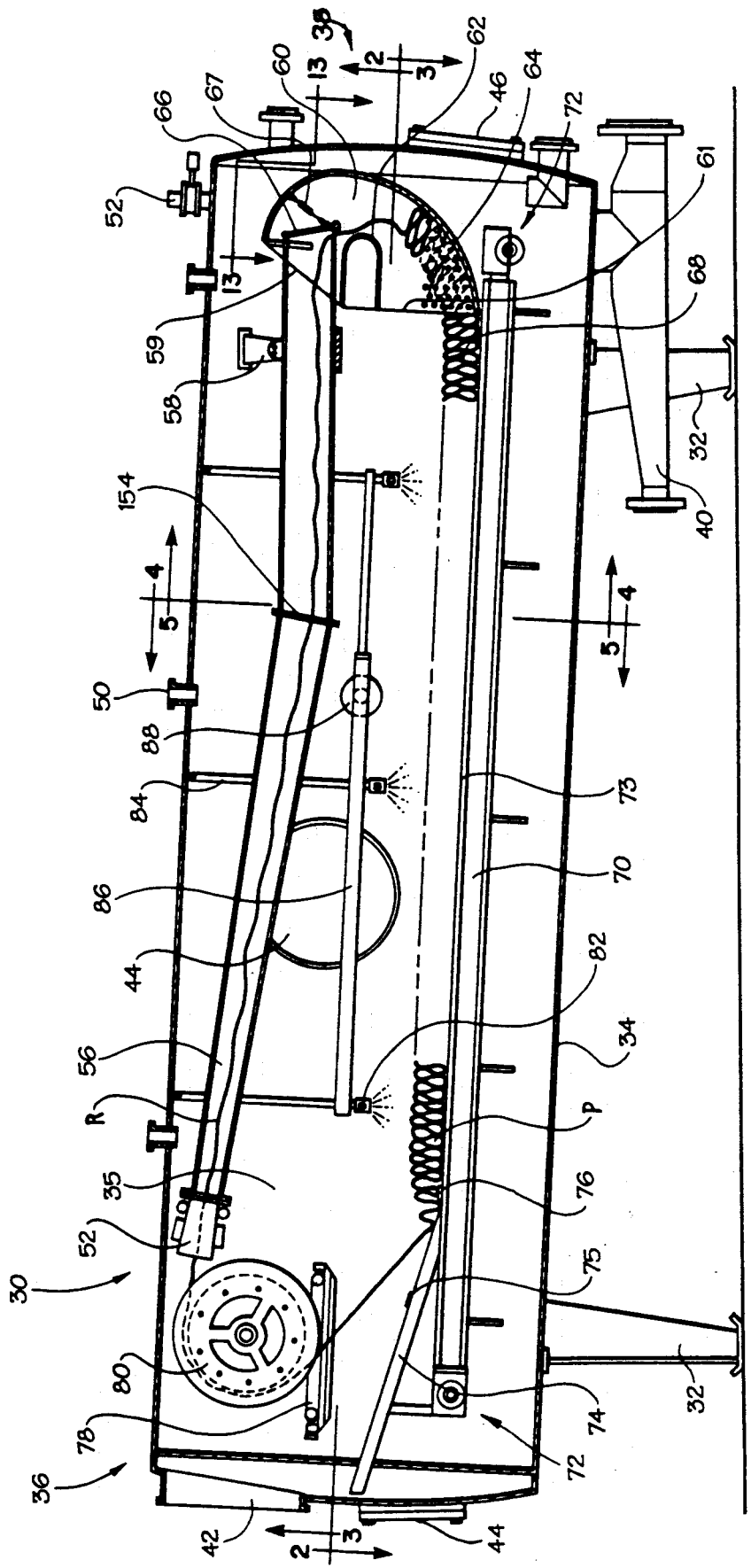
FIG. 1 is a vertical sectional view of an apparatus for low liquid wet treatment of a textile material according to one preferred embodiment of the present invention.

Looking now in greater detail at the accompanying drawings and particularly at FIG. 1, an apparatus 30 for low liquid wet treatment of a textile material according to the preferred embodiment of the present invention is shown in the form of a horizontally oriented dyeing machine for treatment of textile piece goods in cloth rope form having a supporting framework 32 for mounting the apparatus 30 on a floor, with the framework 32 supporting a cylindrical, horizontally oriented pressure vessel 34 having a front or entry end 36 at the left in FIG. 1 and a rear or drainage end 38 at the right in FIG. 1. The pressure vessel 34, the interior of which defines a treatment chamber 35, is supported above tee floor and is angled downwardly with respect to the rear end 38 by the framework 32 for flow of treatment liquid to a drain pipe 40 which projects outwardly from the bottom of the pressure vessel 34 near the lowermost point of the downward inclination. A loading hatch 42 is located at the entry end of the pressure vessel 34 through which textile material in rope form is passed for treatment within the treatment chamber 35. Access to the treatment chamber 35 is also provided by a hatch 44 located in a side wall of the vessel 34, as well as hatch 46 located in the rear end 38 of the vessel 34. An additional access hatch 48 is provided below the loading hatch 42 in the front end 36 of the pressure vessel 34. A plurality of fittings 50 is provided on the top surface of the pressure vessel 34 for applying wash water to rinse the inner walls of the treatment chamber 35. During treatment operations, the vessel 34 is pressurized at greater than atmospheric pressure for increased treatment liquid temperature without boiling. A vent 52 is provided on the upper surface of the pressure vessel 34 at the rear end 38 to provide a relief valve should excess pressure build within the pressure vessel 34.

Contained within the pressure vessel 34 is an assembly for transporting the textile material which is to be treated through the treatment chamber 35, an arrangement for applying treatment liquid to the textile material, and means for circulating the treatment liquid to the arrangement for applying the treatment liquid to the textile material.

Figure 3:
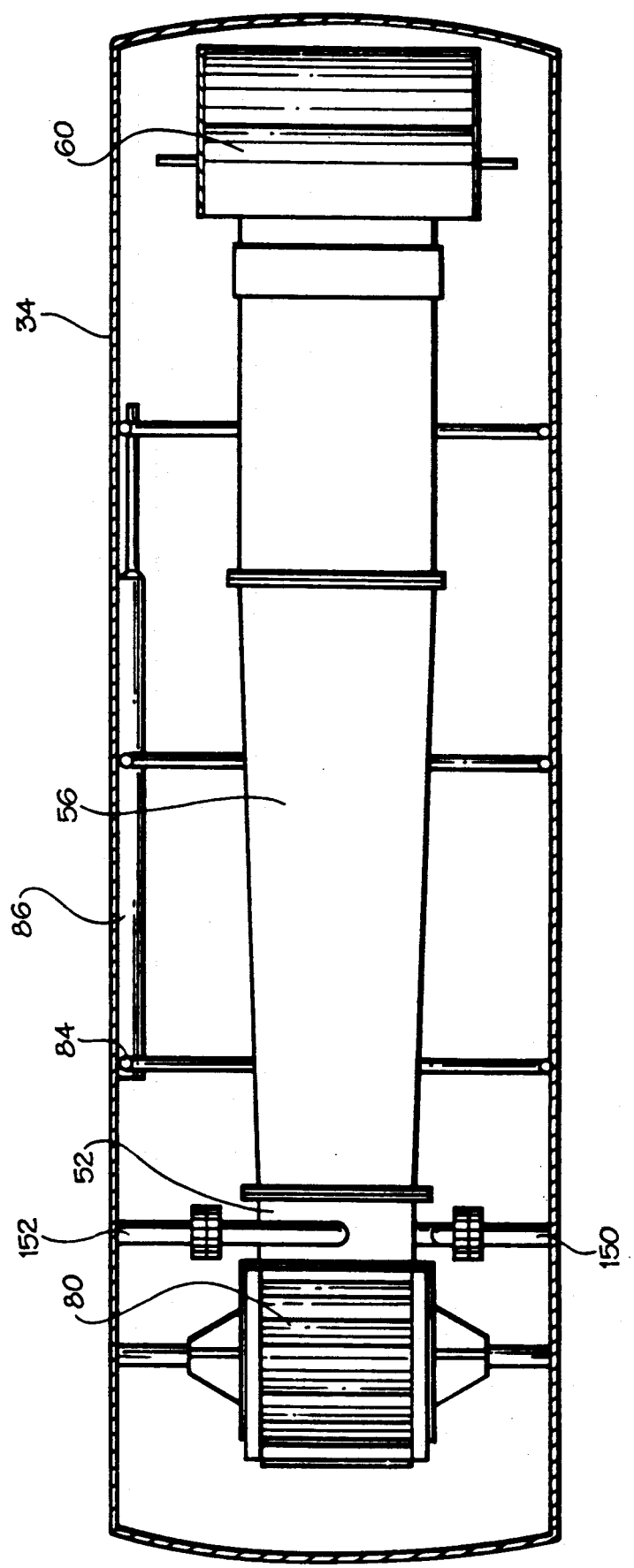
FIG. 3 is a horizontal sectional view of the apparatus of the present invention as illustrated in FIG. 1 and taken along lines 3—3 thereof.

The transport arrangement circulates an endless loop of fabric in cloth rope form, as either unfolded cloth rope R or in plug form P, depending on its location along its predetermined path, as seen in FIG. 1. The textile material circulation path is designated by arrows in FIG. 1. The transport arrangement includes a nozzle 52 located near the loading hatch 42 within the treatment chamber 35. The nozzle 52 is used for introducing treatment liquid, wash water, or a wash water/air mixture to the cloth rope R for propulsion and treatment or washing of the cloth rope R. The nozzle 52 will be explained in greater detail presently. As seen in FIG. 3, a rope return conduit 56 is formed as a generally elongated rectangular channel and is attached at one end to the nozzle 52 and projects outwardly therefrom longitudinally through the treatment chamber 35. The rope return conduit 56 is inclined downwardly for a portion thereof and then becomes inclined slightly upwardly to its end portion located generally in the rear end 38 of the pressure vessel 34. The rope return conduit 56 is suspended from the walls of the pressure vessel 34 by a bracket 58, allowing the rope return conduit to be generally centered widthwise within the pressure vessel 34.

A plug forming chamber 60 is located in the rear end 38 of the pressure vessel 34 at the end of the rope return conduit 56. The plug forming chamber 60 is a curved channel oriented vertically within the pressure vessel 34 having an entry end 59 at the top into which the end portion of the rope return conduit 56 extends and an exit end 61 at the lower end through which the textile material exits. A generally horizontally arranged U-shaped rope guide plate 62 is located in the mid-portion of the plug forming chamber for maintaining the rope as it exits the rope return conduit 56 in a proper plug forming path. Plug formation will be explained in greater detail hereinafter. Both the entry end 59 and exit end 61 of the plug forming chamber 60 open inwardly towards the center of the treatment chamber 35 so that a rope entering the plug forming chamber 60 from the rope return conduit 56 will be directed outwardly in plug form in the opposite direction from which it entered the plug forming chamber 60. Apertures 64 are formed within the lower portion of the plug forming chamber 60 providing drainage of treatment liquid so that the liquid will not interfere with plug formation and will enhance widthwise plug formation. A baffle plate 66 is pivotally attached to the end portion of the rope return conduit 56 and is adjustably suspended in an open position by a turnbuckle 67 attached to the inner wall of the plug forming chamber 60 and the outer surface of the baffle plate 66. The baffle plate 66 directs the rope R downwardly into the plug forming chamber 60 in a direction for optimum plug formation, with the turnbuckle 67 allowing adjustment to best suit the conditions and fabric being treated. A discharge lip 68 extends horizontally outwardly from the exit end 61 of the plug forming chamber 60 to prevent treatment liquid from flowing backward underneath the plug forming chamber 60 and drawing the cloth plug P with it.

Of primary importance to the transport mechanism are the support members 70 which are mounted on and driven by drive mechanisms 72. The support members 70 are located generally beneath the rope return conduit 56 in the lower portion of the treatment chamber 35 and extend longitudinally substantially the length of the treatment chamber 35. The rearward extent of the support members 70 is located adjacent the exit portion 6; of the plug forming chamber 60 and upwardly therebeyond so that the contents of the plug forming chamber 60 will exit the plug forming chamber 60 onto the support members 70 which transport the cloth rope in plug form P through a treatment liquid spray. Near the front end 36 of the pressure vessel 34 within the treatment chamber 35 ramps 74 are mounted to the end portions of the support members 70. The ramps 74 are of similar construction to the support members 70 and each support member 70 has there associated a ramp 74. Sensors 75,76 are located at the entrance to the ramp 74 and a distance up the inclination of the ramp 74 for controlling the speed of the transport mechanism. The support member transport mechanism and its operation will be explained in greater detail presently.

A lifter reel 80 is located near the upper portion of the front end 36 of the pressure vessel 34 within the treatment chamber 35 intermediate the nozzle 52 and the support members 70. The lifter reel 80 is a horizontally oriented cylinder mounted widthwise within the pressure vessel 34 and it has a corrugated surface. The lifter reel 80 is driven and caused to rotate by a conventional electric motor arrangement (not shown) and the function of the lifter reel 80 is to remove cloth from the end of the plug on the ramps 74 and to direct the cloth back through the nozzle 52. A pot eye 78 is located intermediate the lifter reel 80 and the support members 70. The pot eye 78 is a generally square or rectangular frame-like structure having an opening formed therein through which rope R that is being withdrawn from plug form P must pass to maintain alignment of the rope R on the lifter reel 80.

As can be seen in FIG. 1, transport of textile material in cloth rope form is a circulatory operation progressing from the nozzle 52 through the rope return conduit 56 into the plug forming chamber 60 in rope form and then out onto the support members 70 in plug form where it is moved through a spray of treatment liquid. The cloth is then removed from plug form by the lifter reel 80 and redirected thereby into the nozzle 52.

The arrangement for applying treatment liquid to the textile material includes the aforementioned jet nozzle 52, which is of the construction described in Turner et al U.S. Pat. No. 4,716,744. As mentioned before, the nozzle is used for application of treatment liquid, wash water, and/or propulsion air. The nozzle will be described in greater detail presently.

Figure 4:
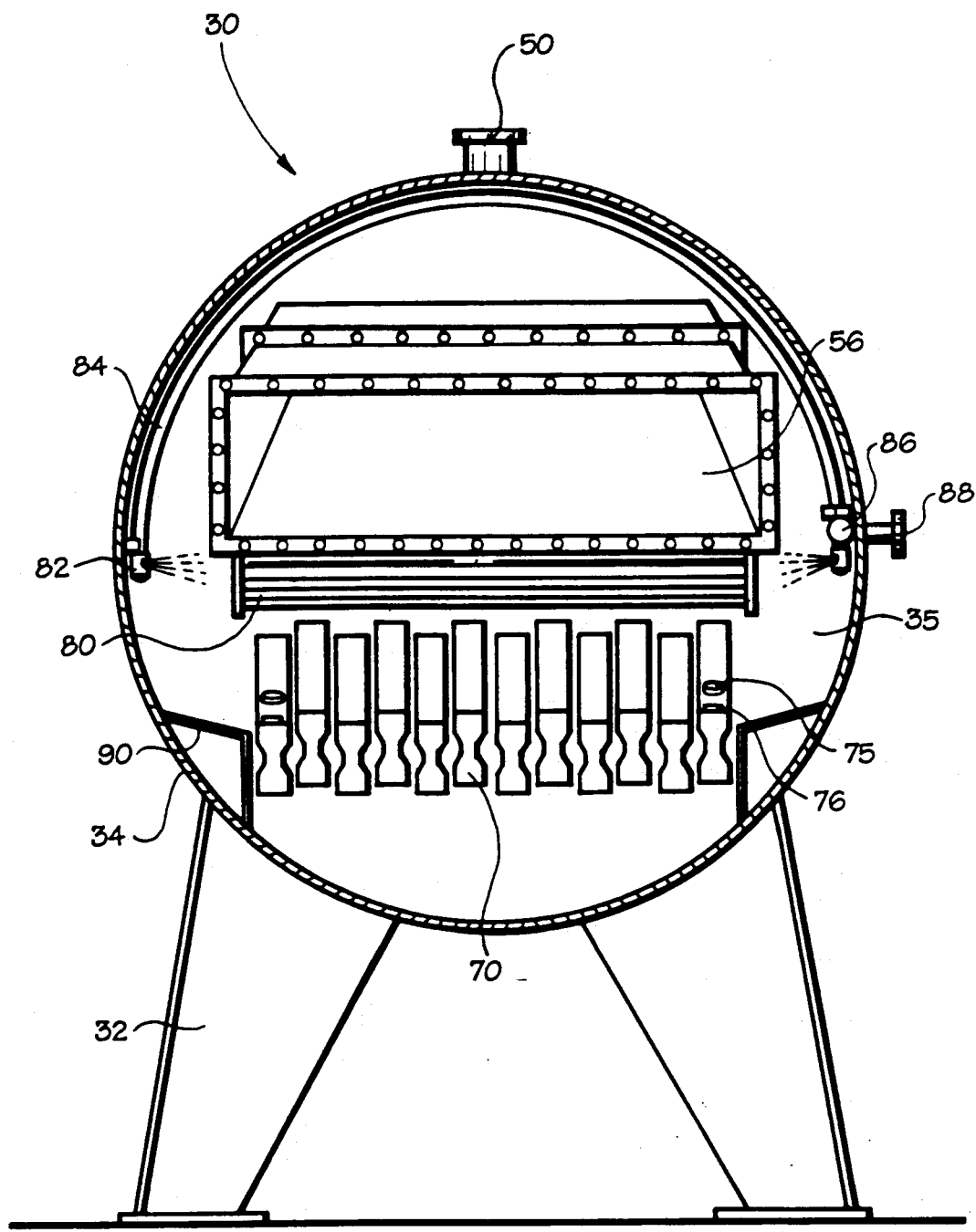
FIG. 4 is a vertical sectional view of the apparatus of the present invention as illustrated in FIG. 1 taken along lines 4—4 thereof.
Figure 5:
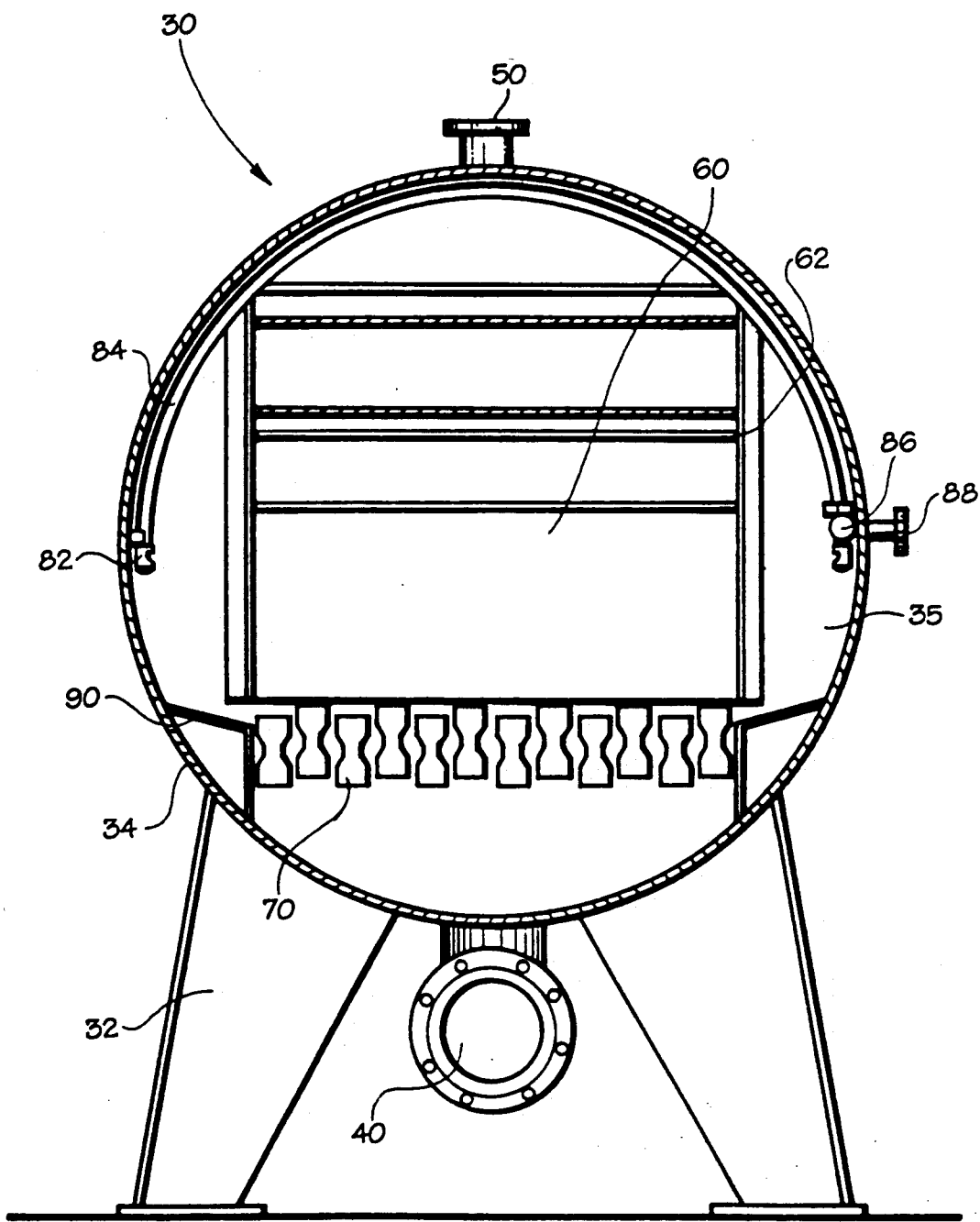
FIG. 5 is a vertical sectional view of the apparatus of the present invention as illustrated in FIG. 1 and taken along lines 5—5 thereof.

The arrangement for applying treatment liquid to the textile material within the treatment chamber 35 as the material is transported by support members 70 includes horizontally opposed spray nozzles 82 which directly oppose one another from either side of the cylindrical pressure vessel 34. The spray nozzles 82 are attached to one another by semi-circular hoop-like conduits 84 which extend adjacent the inner surface along the upper half of the curvature of the cylindrical pressure vessel 34. This arrangement is best seen in FIG. 4 and FIG. 5. A plurality of spray nozzles 82 is positioned at spacings longitudinally along the treatment chamber 35 in a region above the support members 70 and below the rope return conduit 56 for application of treatment liquid to the cloth plug P as it is transported through the treatment chamber 35 by the support members 70. The nozzle conduits 84 are joined to one another and supplied by manifold 86 which is of a tubular configuration extending longitudinally between the conduit 84 nearest the front end 36 of the pressure vessel 34 and the conduit 84 nearest the rear end 38 of the pressure vessel 34. A fitting 88 is provided intermediate the side wall of the pressure vessel 34 and the manifold 86. The fitting 88 breaches the side wall of the pressure vessel 34 through which treatment liquid may be supplied to the manifold 86 for application to the cloth plug P by the spray nozzles 82. A series of fittings 50 are positioned at spacings along the top portion of the pressure vessel 34. These fittings 50 are of the type disclosed in Turner et al U.S. Pat. No. 4,716,744 and provide sprays of liquid onto the inner walls f the pressure vessel 34 during treatment to avoid accumulation of treating liquid thereon.

As previously mentioned, a plurality of support members 70 are used to transport the cloth rope in plug form P from the exit 61 of the plug forming chamber 60 through the treatment chamber 35 for treatment using nozzles 82 to a position where the spray generated by nozzles 82 ends and the lifter reel 80 removes the textile material from the plug P and lifts the textile material from the support members 70. The arrangement of the support members is best seen in FIG. 2.

Figure 2:
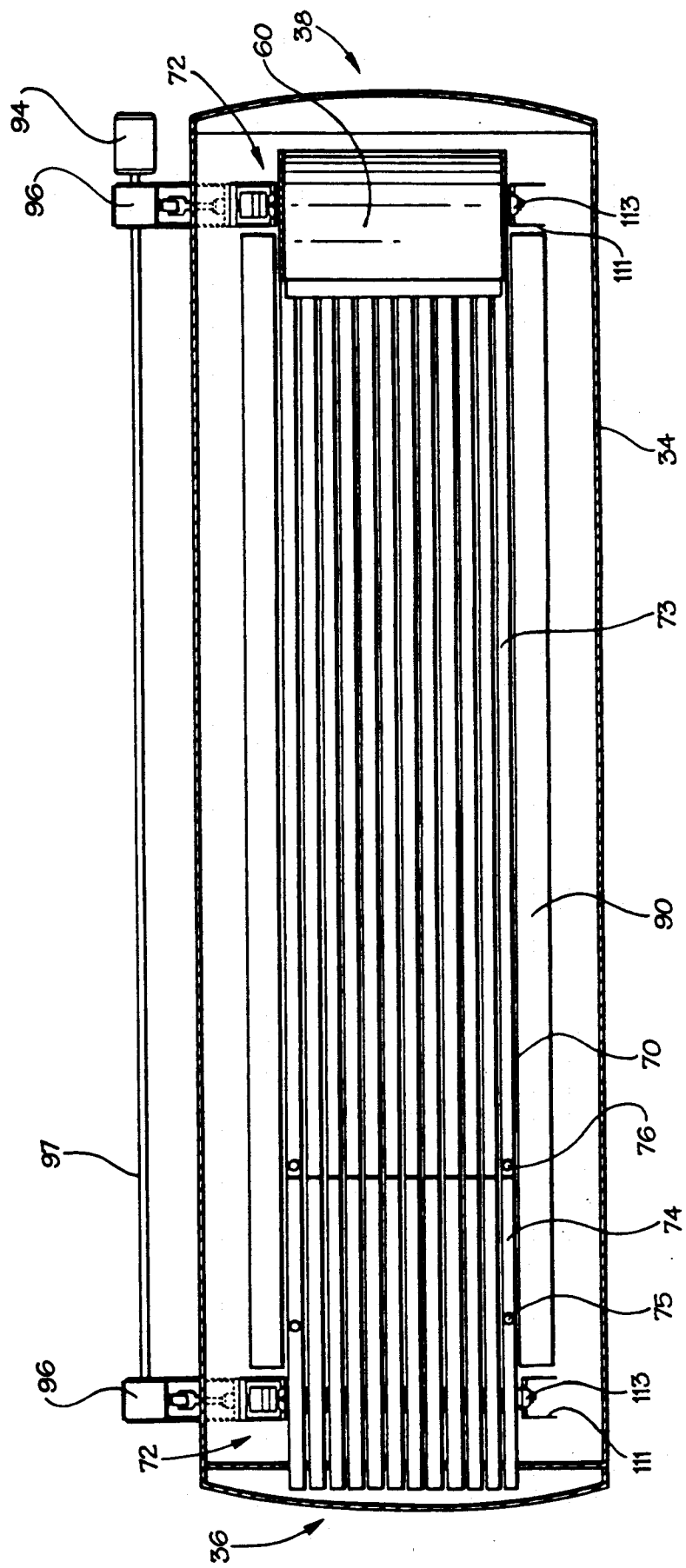
FIG. 2 is a horizontal sectional view of the apparatus of the present invention as illustrated in FIG. 1 and taken along lines 2—2 thereof.

As seen in FIG. 2, the transport mechanism includes a plurality of support members 70 arranged in a side-by-side relation longitudinally within the treatment chamber 35 substantially the length of the pressure vessel 34. Both ends of the support members 70 are driven in an oscillating manner by the drive mechanism 72 which includes a drive motor 94, two gear boxes 96, and a drive train 98. Both ends of the bars are driven in a similar fashion. Buffer rails 90 are provided on either side of the group of support members 70 and are attached to the inside wall of the pressure vessel 34. The buffer rails 90 are coated or otherwise provided with a smooth surface so that any material which extends beyond the lateral edge of the support members 70 is supported so that the material does not spill over the side of the support members 70 into the lower well of the pressure vessel 34. As best seen in FIGS. 4 and 5, the support members 70 are driven in an oscillating fashion. As will be seen, the support members 70 are arranged on an eccentric crank shaft assembly 99 so that alternate support members 70 are raised and driven forward through a supporting and moving path while intermediate support members are lowered and reversed through a return path. Textile material being supported on the support members is moved forward in a sinusoidal fashion as support members 70 are raised and moved forwardly. They contact and support the textile material as they lift the material and advance the material forwardly. While this operation is ongoing, intermediate support members that are out of engagement with the textile material are moved downwardly and in a direction opposite the direction of movement of the textile material such that when the advancing step is complete, the support members 70 that had advanced the material drop away and travel through the return path while the newly returned support members 70 engage the textile material, support the material, and raise and advance the material in like fashion. By the continued oscillatory motion of the support members 70, the textile material is caused to advance forward with a sinusoidal motion. The upper, contact surfaces 73 of the support members 70 are coated or otherwise provided with a surface texture providing sufficient friction between the surface 73 and the cloth plug P depending on this type of material being treated and the speed of oscillation to prevent the support members 70 from sliding underneath the cloth plug P which would impede the advancement of the cloth plug P.

Figure 6:
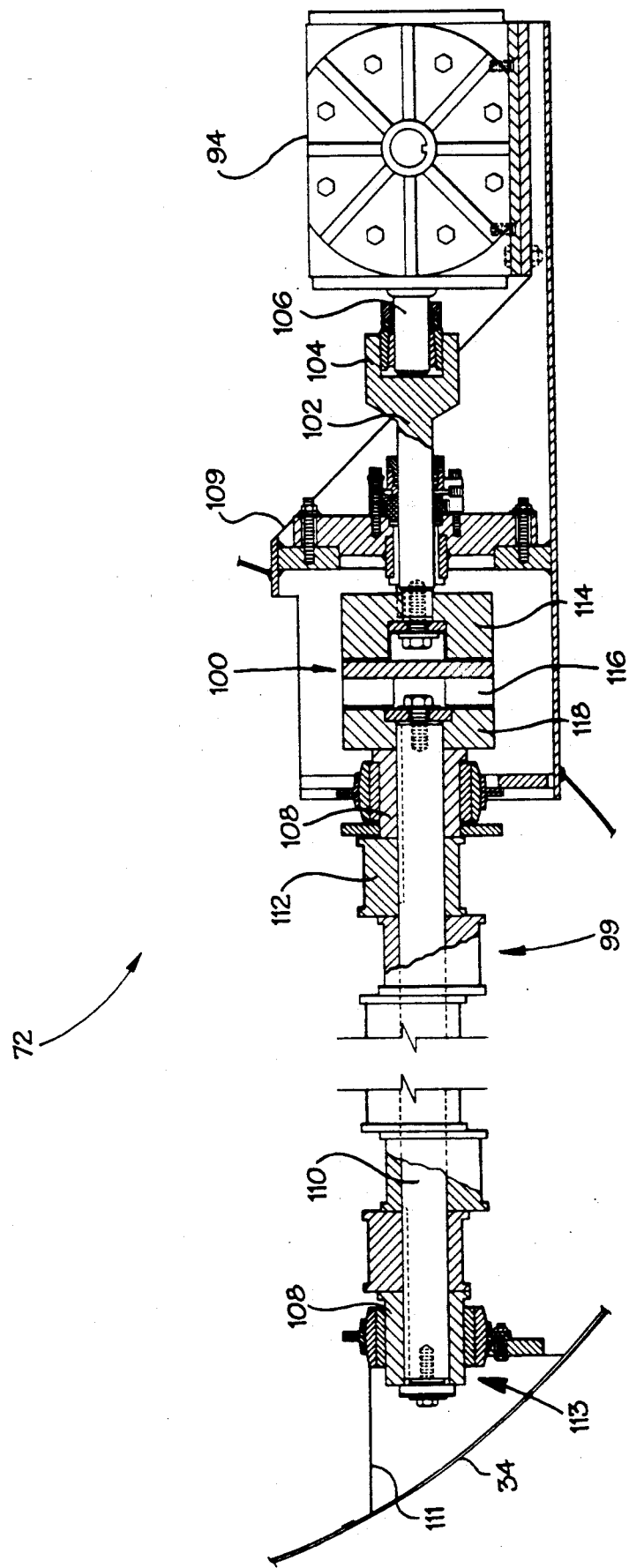
FIG. 6 is a sectional view of the plug support member drive assembly of the apparatus of FIG. 1.

As mentioned before, both ends of the support members 70 are driven into oscillation in unison by virtue of being mounted on a crankshaft assembly 99. Each end of the support members 70 is provided with a crankshaft assembly 99. As seen in FIG. 2, a common motor 94 drives two gear boxes 96 utilizing a connector shaft 97. The crankshaft assembly 99 consists of series of collars 112 arranged in an end-abutting side-by-side relationship along a main drive shaft 110 and fitted tightly together, giving an effective shaft diameter which is larger than that of the main drive shaft 110. The collars 112 are eccentrically oriented to create the oscillating motion imparted to the support members 70 as the shaft 110 is caused to rotate. A motor 94 drives the drive shaft 110 using a half shaft 102 coupled to the main drive shaft assembly 99 by a coupling assembly 100. The drive motor 94 drives two 90° angular gear boxes 96 (not shown in FIG. 6) each having pinion shaft 106 extending outwardly therefrom in the direction of the pressure vessel 34. The pinion shaft 106 is attached to a yolk portion 104 of the half shaft 102 which is attached to the coupling assembly 100. A coupler housing 109 breaches the pressure vessel 34 providing access to the support members 70 within the pressure vessel 34 and protection to the coupling assembly 100. Conventional bearings 108 support the various shaft assemblies. A bracket 111 is provided for mounting the idler end 113 of the drive shaft assembly 99 to the inner wall of the pressure vessel 34.

Figure 7:
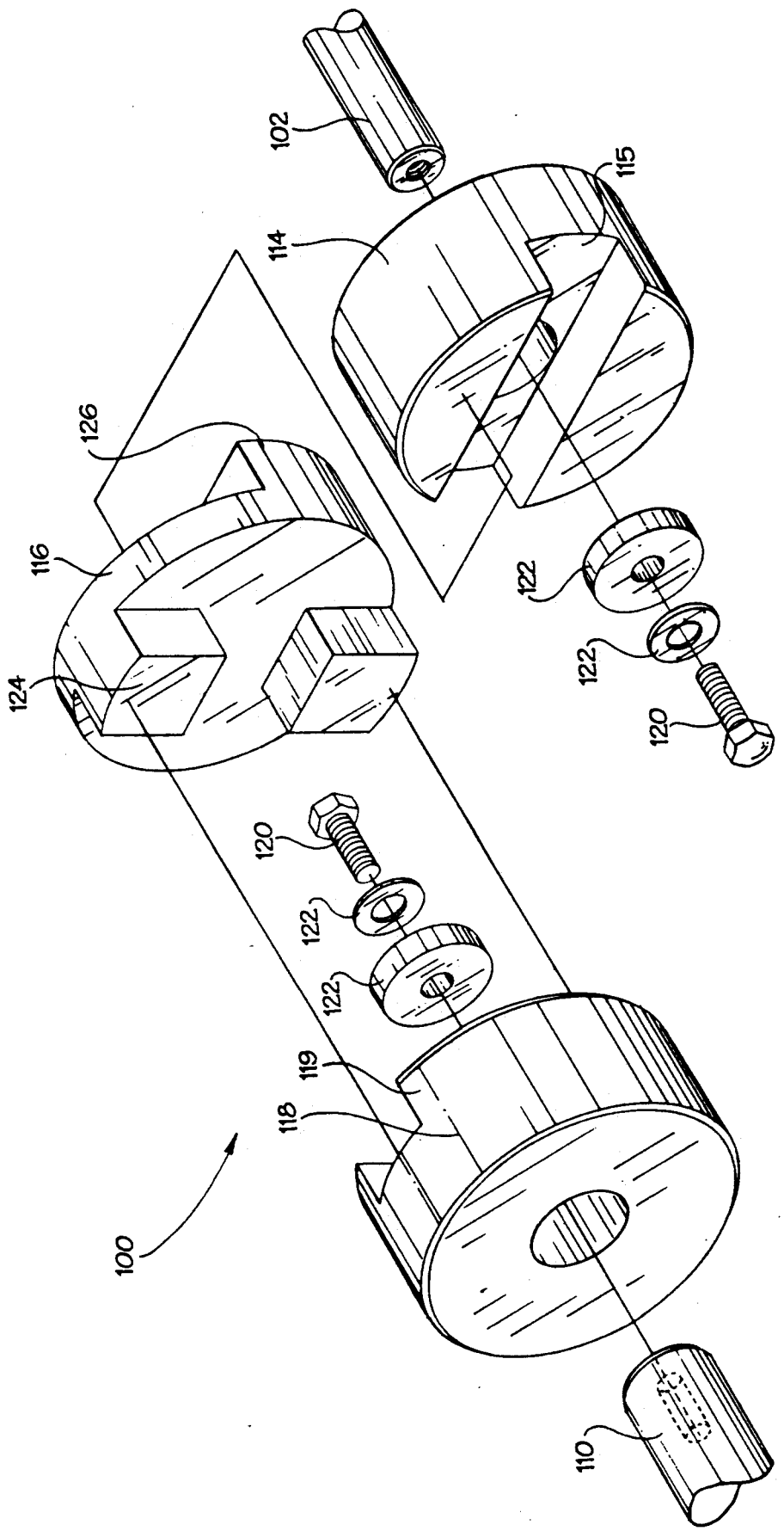
FIG. 7 is an exploded view of the coupling portion of the support member drive assembly illustrated in FIG. 6.

The coupling assembly 100 is best seen in FIG. 7. A drive yolk 114 which consists of a cylinder having a groove 115 formed therein is attached to the half shaft 102 using conventional screws 120 and washers 122. A like yolk 118 i attached in a similar manner to the drive shaft 110. Like the drive yolk 114, the crank yolk 118 is a cylinder having a groove 119 formed therein. The yolks 114,118 are oriented such that the grooves 115,119 formed therein are perpendicular to one another. A coupler plate 116 is fitted therebetween. The coupler plate 116 is a generally flat disk having lobes 124,126 projecting outwardly from each flat surface thereof. The lobes 124,126 are formed to fit within the grooves 115,119 in the yolks 114,118 and the diameter of the coupler plate 116 is equal to the diameter of the yolks 114,118. The coupler plate is located intermediate the yolks 114,118 having the lobes 124,126 engaged with the grooves 115,119 such that when the half shaft 102 is driven into rotation the drive yolk 114 is caused to rotate and the engagement of the lobes 12 in the drive yolk groove 115 will cause the coupler plate 116 to rotate with the drive yolk 114 and the engagement of the lobes 124 with the crank yolk groove 119 cause the crank yolk 118 to rotate in a like manner causing rotation of drive shaft 110. Thus, minor misalignment of the shafts 102,110 is accommodated.

Figure 8:
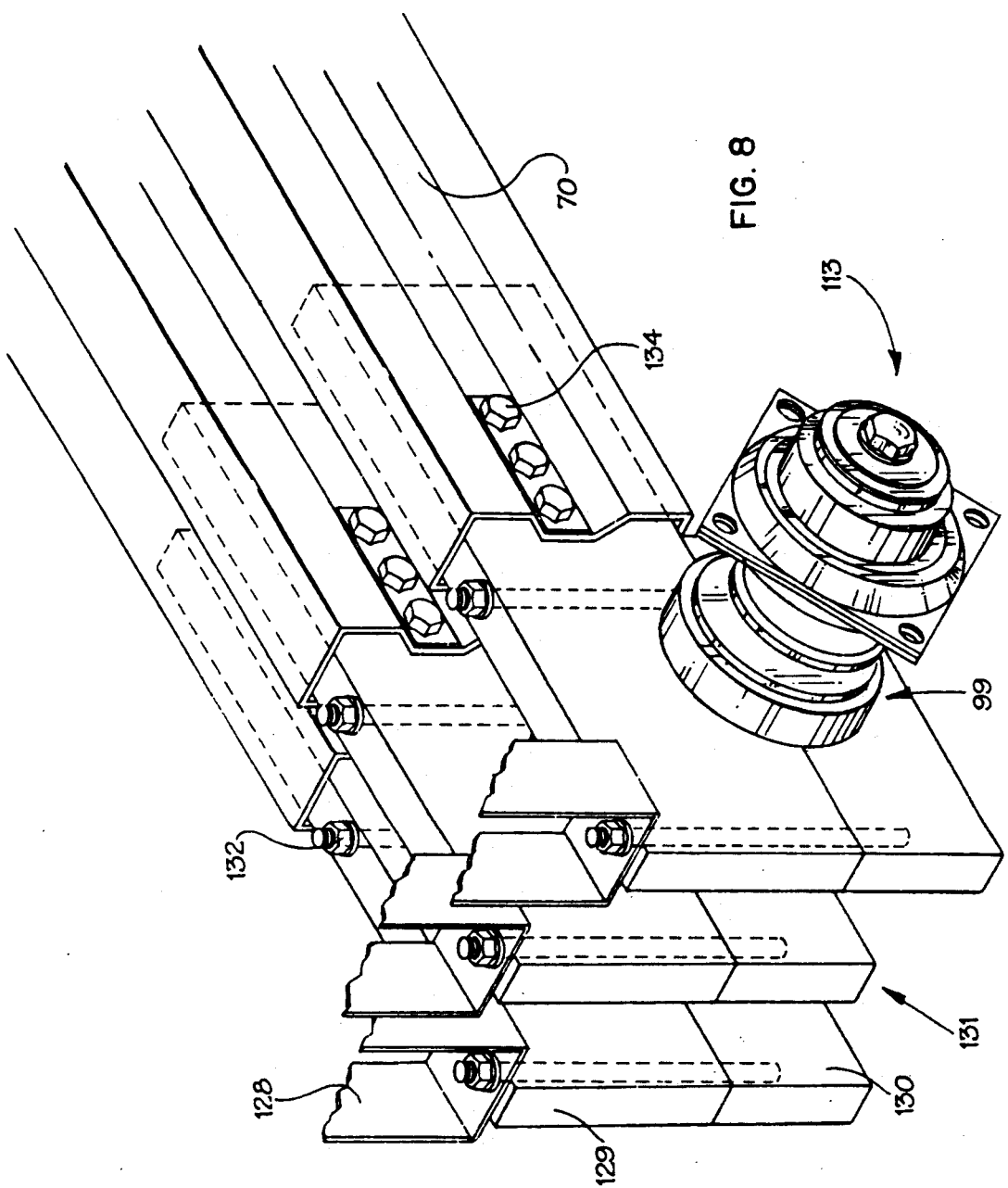
FIG. 8 is a perspective view of a representative portion of the front main bearings attaching the support members attached to the support member drive shaft.
Figure 9:
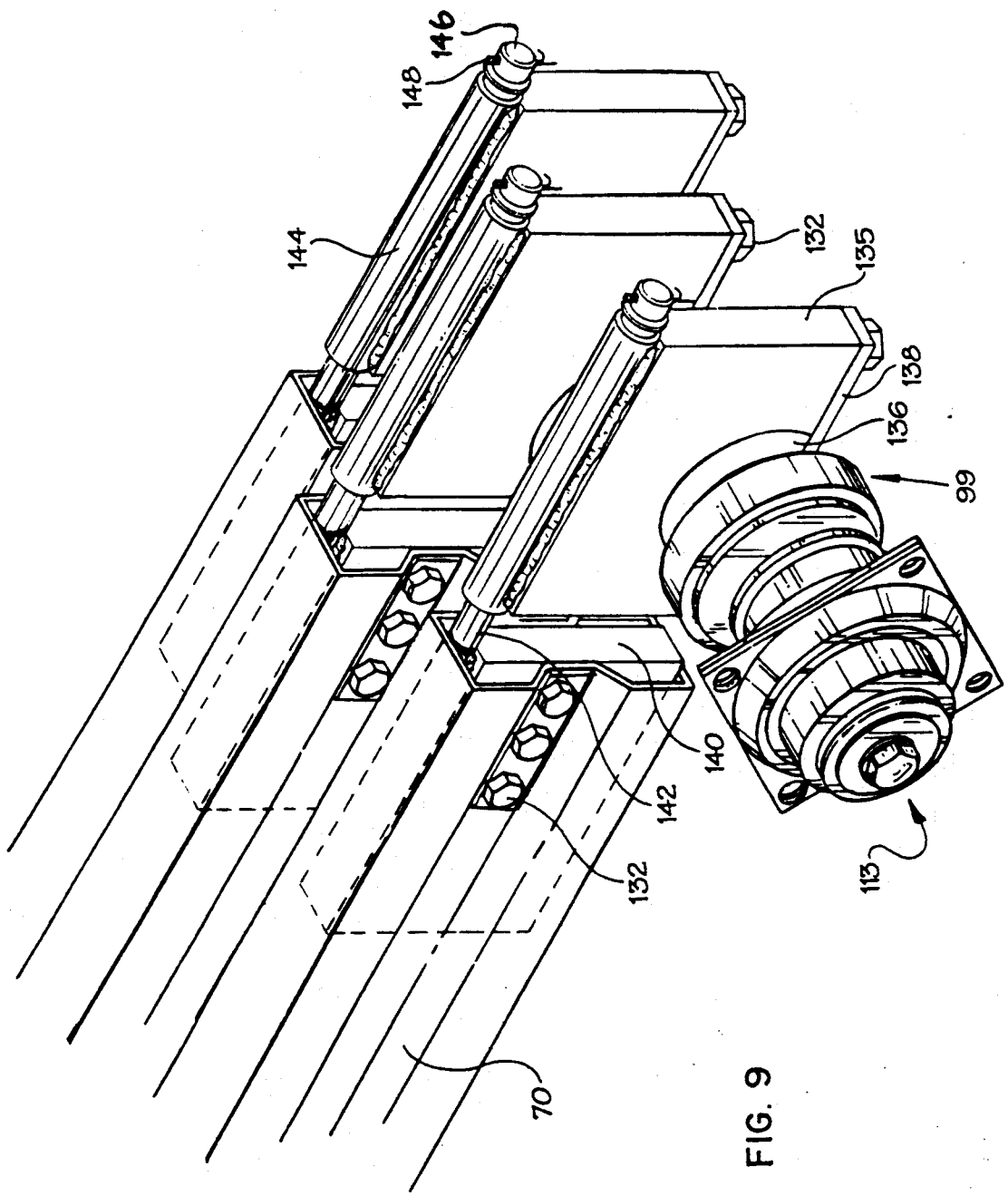
FIG. 9 is a perspective view of a representative portion of support members and the rear main bearings attached to the rear drive shaft of the support member drive assembly.
Figure 10:
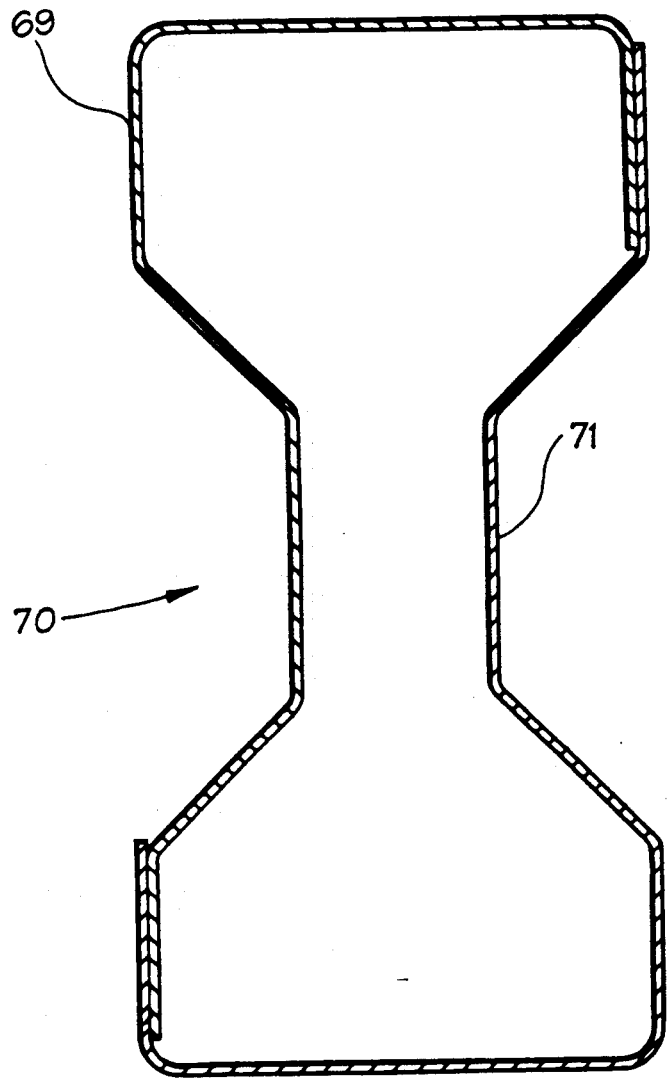
FIG. 10 is a vertical sectional view of a support member of the apparatus of FIG. 1

The support members 70 are two-piece units having a left portion 69 and an identical but inverted right portion 71 as best seen in FIG. 10. The units are generally I-shaped units which are hollow and lightweight to avoid becoming a heat sink as seen in FIGS. 8 and 9. The support members 70 are attached to the drive shaft assemblies 99 by main bearings 131,135. As previously mentioned, both ends of the support members 70 are driven. Each end is attached to its respective drive shaft assembly 99 in a different manner. FIG. 8 illustrates the attachment of the support members 70 to the drive shaft assembly 99 in the front end 36 of the pressure vessel 34. Each front main bearing 131 is a generally thin rectangular block of two portions 129,130 having an opening formed therein providing a bearing which surrounds the collar 112 (not shown in FIG. 8) so that the rotary motion of the drive shaft assembly 99 is transformed into an oscillatory motion of the support members 70. The upper portion 129 of the main bearing block 131 is attached to the lower portion 130 using long conventional bolts 132. These bolts 132 also act as mounts for brackets 128 which extend upwardly from the upper portion 129 of the main bearing block 131 and support the upper portion of the inclined ramp 74. The ramp 74 and bracket 128 orientation is best seen in FIG. 1. The upper portion 129 of the main bearing block 131 extends inwardly into the hollow portion of the support member 70. Conventional bolts 134 are used to bolt the support member 70 to the upper portion 129 of the main bearing block 131.

As seen in FIG. 9, a similar arrangement is provided on the portions of the support members 70 located in the rear end 38 of the pressure vessel 34. The rear main bearing blocks 135 are generally thin rectangular blocks having a semi-circular opening formed in the bottom thereof. A metal bearing 138 which is also semi-circular fits within the cut-out and is held in place by a bracket 138 which in turn is held in place by conventional bolts 132. The bearings 135 rest on collars 112 which are attached to the drive shaft assembly 99. Mounting blocks 140 are inserted in the hollow portion of the support members 70 as in the front bearing assembly and held in place by bolts 132. A connecting rod 42 is welded or otherwise attached to the upper surface of the mounting block 140 extending longitudinally outwardly from the support members 70. The connecting rod 142 is engaged with a retaining tube 144 which is welded or otherwise attached to the upper surface of the bearing block 135. The connecting rod 142 fits loosely in the retaining tube 144 extending through the tube and out the other end. An end cap 146 is attached to the end portion of the connecting rod 142 extending beyond the retaining tube 144 and is held in place with a cotter pin 148. Thus, the connecting rod 142 is free to move about a certain distance in the retaining tube 144. This arrangement is important to proper operation of the drive assembly in that with both ends of the support members 70 driven, a solid mount on both ends could result in the binding of support members 70. This arrangement allows some movement of the connecting rod 142 with respect to the bearing block 145 allowing non-binding oscillatory movement of the support members 70.

Figure 11:
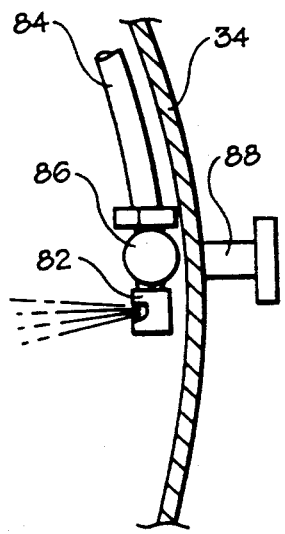
FIG. 11 is an enlarged elevational view of a treatment liquid application nozzle of the apparatus of FIG. 1.

As the textile material is moved along by the support members 70, treatment liquid is applied utilizing nozzles 82, a supply manifold 86, and connecting conduits 84. This arrangement can best be seen in FIGS. 4 and 5. As mentioned before and with reference to FIG. 1, a plurality of nozzles 82 is attached to either end of a semi-circular conduit 84 and a plurality of these assemblies are located at spaced intervals along the length of the pressure vessel 34. The semi-circular conduits 84 are formed to mount closely adjacent the inner upper wall surface of the pressure vessel 34. The nozzles 82 can best be seen in FIG. 11. As the textile material is moved along the support members 70, treatment liquid is sprayed from opposing pairs of nozzles 82 in a horizontal manner. The horizontally opposed sprays collide and their spray pattern is disrupted, resulting in a mist of treatment liquid falling downwardly onto the textile material. These interactive sprays provide a substantially complete and uniform treatment for the textile material. Treatment liquid is also applied over the inner walls of the pressure vessel 34 through the aforementioned fittings 50. Recirculation of treatment liquid is accomplished utilizing external piping (not shown) in a conventional manner such as is shown in Turner et al U.S. Pat. No. 4,716,744.

Figure 14:
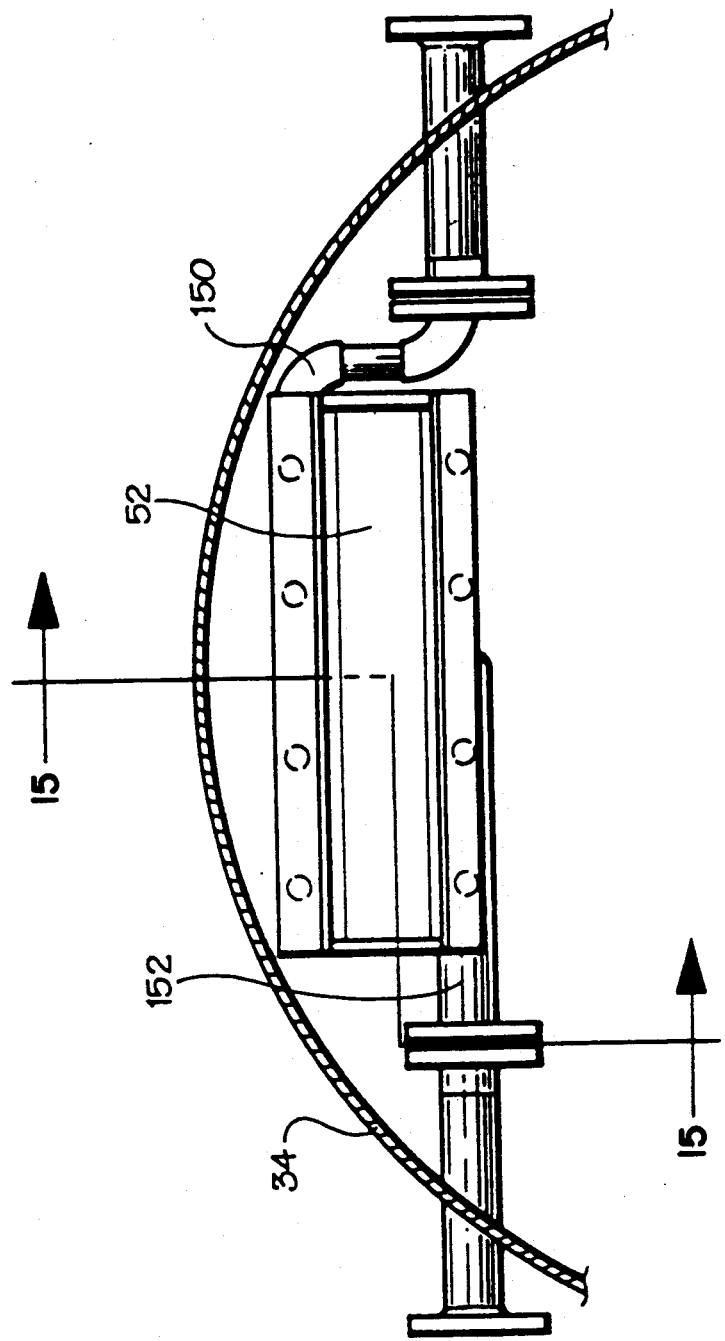
FIG. 14 is an end elevational view of the liquid application and propulsion nozzle of the apparatus illustrated in FIG. 1.
Figure 15:
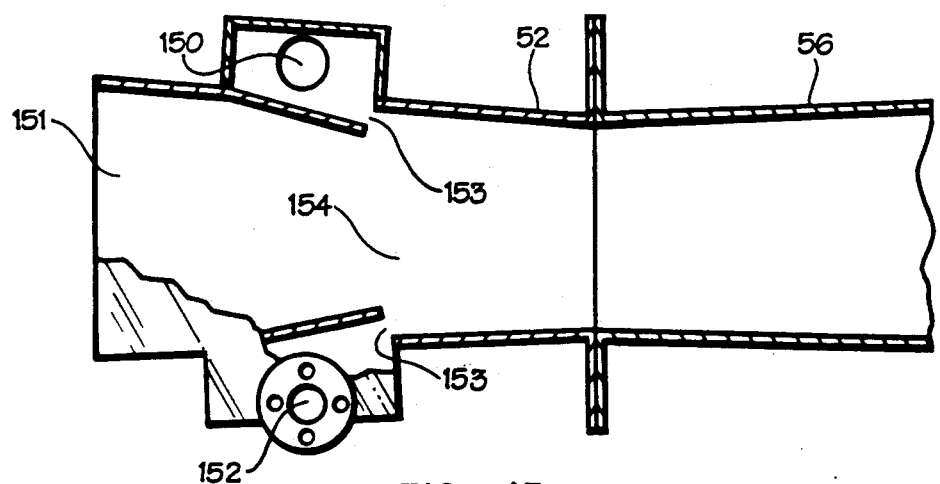
FIG. 15 is a longitudinal vertical sectional view of the nozzle illustrated in FIG. 14 and taken along lines 15—15 thereof.
Figure 16:
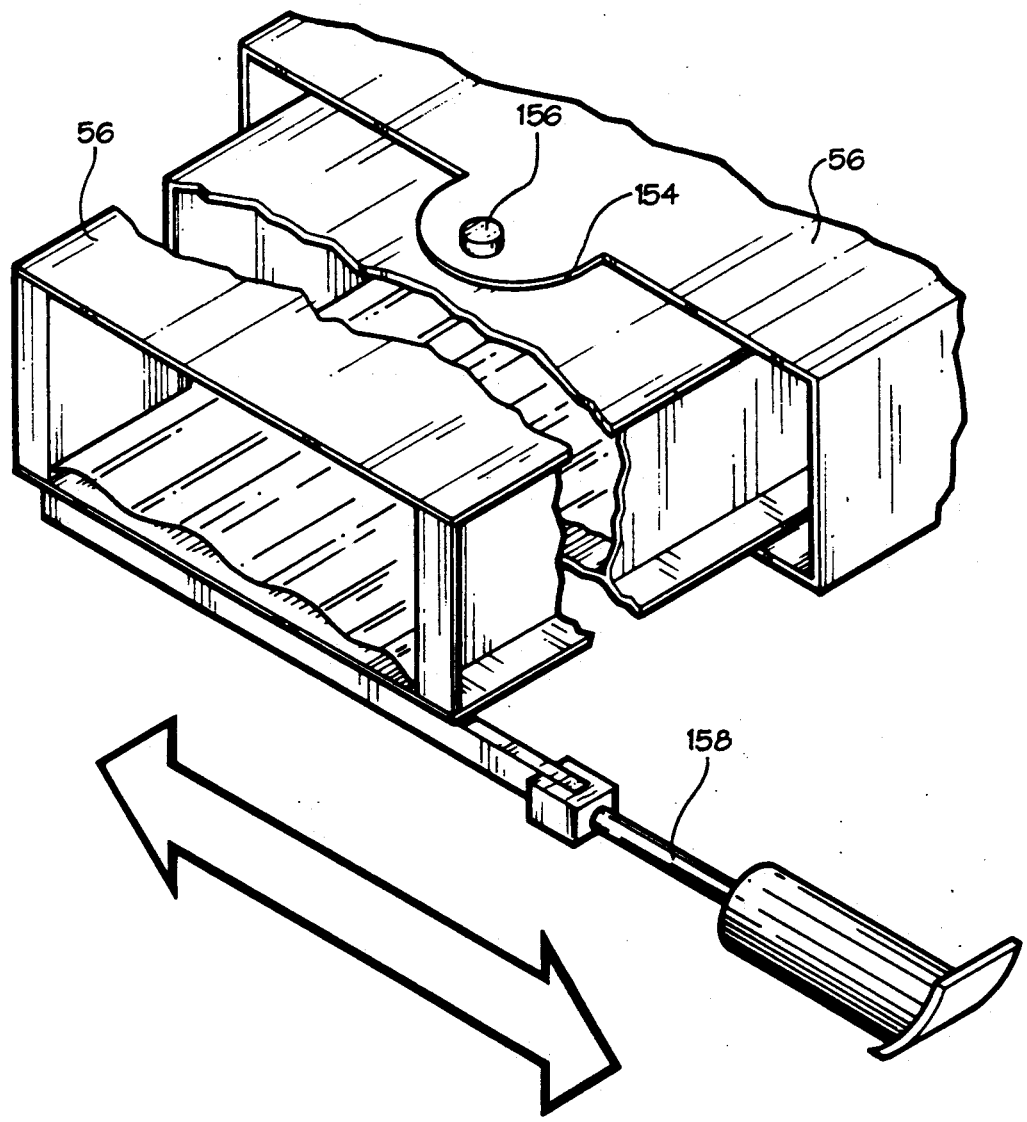
FIG. 16 is a perspective view, partially broken away, of a variation of the rope return conduit of the apparatus of FIG. 1 illustrating an oscillating arrangement thereof.

Treatment liquid is also applied utilizing the nozzle 52. With reference to FIGS. 14 and 15, the nozzle 52 is generally rectangular in cross section and is mounted at the entrance to the rope return conduit 56. As heretofore mentioned, this nozzle is of the type explained in Turner et al U.S. Pat. No. 4,997,761. The nozzle is fed by an upper feeding pipe 150 and lower feeding pipe 152 which supply treatment liquid, wash water, or compressed air into the plenum 154 in a downstream direction through laterally extending slots 153 opening in a downstream direction into the path that the textile material travels. When the textile material is undergoing treatment, it enters the nozzle at the entry end 15 thereof as a cloth rope R. Treatment liquid is applied through the slots 153 resulting in a stream of treatment liquid which causes the rope of textile material to be propelled down the rope return conduit 56. Depending on conditions, treatment liquid may be introduced through only one feeding pipe and slot 153, preferably the lower feeding pipe 152 and slot 153. Water may also be applied to the textile material in a like manner through the nozzle 52 and compressed air may be mixed with the water to facilitate cloth rope transport with a minimum of water.

The rope return conduit 56 provides a channel through which the rope material travels in route to the plug forming chamber 60. The cloth rope R is propelled through the rope return conduit 56 by a stream of treatment liquid or wash water or a combination of wash water and air. The rope return conduit 56 is inclined downwardly from the nozzle 52 to a juncture position 154 intermediate the nozzle 52 and the plug forming chamber 60. At this juncture 154 the rope return conduit 56 levels off and inclines upwardly slightly forming a location where the treatment liquid velocity is reduced and a pool forms providing for a lateral spreading of cloth rope R for enhanced plug formation.

Figure 12:
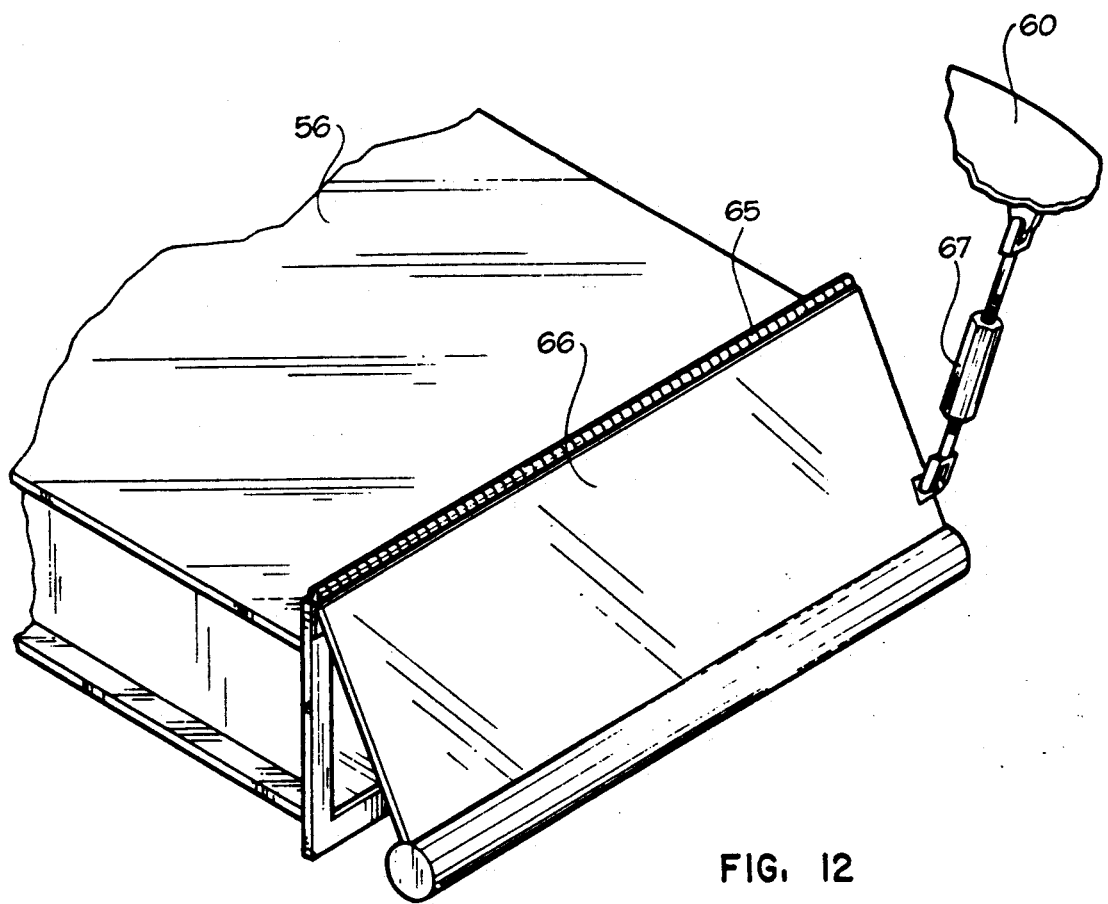
FIG. 12 is a perspective view of the end portion of the rope return conduit of the apparatus of FIG. 1 illustrating the baffle plate and the mounting thereof.

A baffle plate 66 is attached to the end portion of the rope return conduit 56 as it enters the plug forming chamber 60. The baffle plate 66 directs the cloth rope R downwardly into the plug forming chamber 60 and reduces treatment liquid splash thereinto. As seen in FIG. 12, the baffle plate 66 is mounted to the rope return conduit 56 using a piano hinge 65. A turnbuckle 67 is provided which is attached intermediate the inner wall surface of the plug forming chamber 60 and the baffle plate 66. The turnbuckle 67 may be adjusted providing for various degrees of openness of the baffle plate 66 to accommodate different types of fabric.

Figure 13:
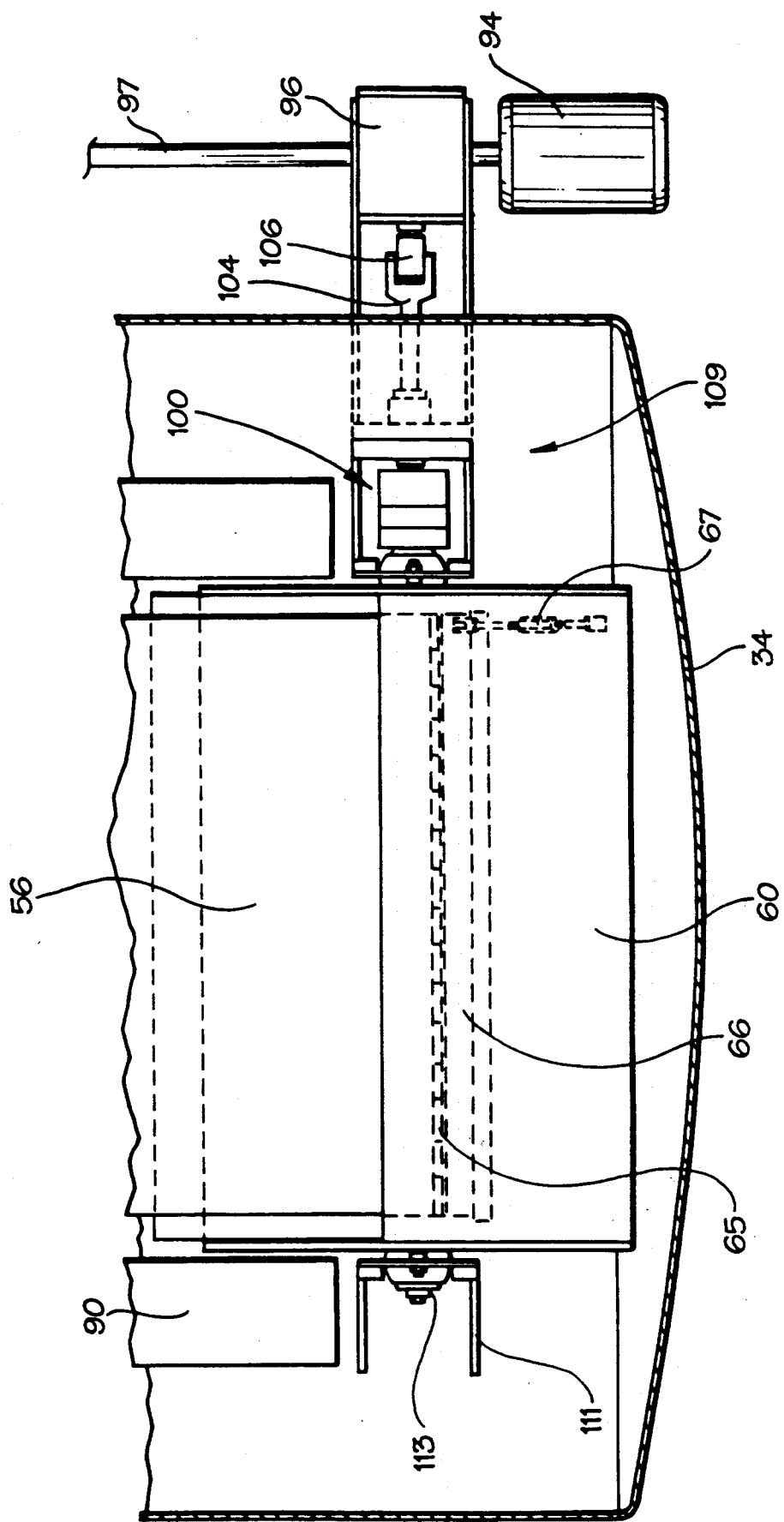
FIG. 13 is a partial sectional view of the plug forming chamber of the apparatus illustrated in FIG. 1 and taken along lines 13—13 thereof.

For narrow fabric ropes, the rope return conduit 56 is pivotally mounted at the juncture 154 so as to be able to move in a side-to-side fashion. An oscillation driver 158 is attached to the underside of the rope return conduit 56 at a position downstream of the pivoting inner connection 156 and when activated, the oscillation driver 158 causes the end portion of the rope return conduit to oscillate from side to side. This motion causes a narrow fabric rope R substantially fully fill the plug forming chamber 60. The entry end portion 59 of the rope return conduit 56 is shown in top view in FIG. 13 which shows the location of the baffle plate 66, the turnbuckle 67 and the piano hinge 65 as the rope return conduit 56 terminates at the entrance 59 to the plug forming chamber 60.

Operation of the preferred embodiment of the present invention is generally as follows. With reference to FIG. 1, a typical dyeing operation will be described. It should be known however that virtually any liquid treatment of a textile material in endless rope form may be performed by the present invention, including washing and other chemical treatments thereof. A rope of textile material is introduced in the apparatus 30 through the loading hatch 42 and is directed over the lifter reel 80 into the nozzle 52. The rope is fully fed into the machine and the rope ends are sewn together or otherwise attached to form the endless rope R. The loading hatch 42 is then closed and sealed and the pressure vessel 34 is then pressurized. A jet of treatment liquid, such as dye liquor, is introduced into the nozzle 52 and the turbulent flow of the treatment liquid propels the rope of textile material through the rope return conduit 56. At the juncture 154 the rope return conduit 56 levels off somewhat and the rope spreads laterally. From the rope return conduit, the rope R flows outwardly past the baffle plate 66 into the plug forming chamber 60 where the rope is caused to form into tightly backed folds which forms the plug P. If the rope used is narrow, the oscillating drive mechanism 158 of the rope return conduit 56 is activated and the rope is plated into plug form within the plug forming chamber 60. Treatment liquid drains through the apertures 64 formed in the plug forming chamber 60 and then outwardly through the drain pipe 40. The rope R exits the plug forming chamber 60 onto the plug support members 70 which are, by this time, oscillating. The cloth plug P is supported and advanced on the support members 70 which are moving through their supporting and advancing path as other plug members 70 are moving through their return path. The sinusoidal movement of the plug P continues as the plug traverses the treatment chamber 35.

Treatment liquid is supplied from outside the pressure vessel 34 through the fitting 88 into the supply manifold 86 and is emitted in horizontal streams through the nozzles 82. The horizontal sprays from the nozzle pairs 82 interact above the plug P which disrupts the spray pattern from the nozzles. This disruption causes the treatment liquid to fall as a mist on the plug P soaking the plug P with treatment liquid. As the plug P progresses through the treatment chamber 35, it is being continually misted by treatment liquid.

As the plug approaches the end of the support members 70, it encounters sensor 76 and possibly sensor 75. The sensors operate to control the speed with which the rope traverses its path of movement. The sensors provide an optimum position of withdrawal of the cloth rope R by the lifter reel 80 from plug form P. If sensor 76 becomes uncovered in that it is not contacted by the plug P, the speed of plug travel will be increased or the speed of cloth travel caused by the nozzle 52 is reduced. If, on the other hand, the sensor 75 located a distance up ramp 74 comes in contact with the plug P, the plug travel speed will be reduced or the rope travel will be increased. By the operation of the sensors 75,76, a region of rope withdrawal is defined on the ramp 74. As the plug enters the region of rope withdrawal, the lifter reel 80 withdraws the rope from the plug folds and redirects the rope into the nozzle 52 for another cycle through the treatment chamber 35.

Once dyeing is complete, the textile material may be washed utilizing the "once-through washing" method. Wash water or a mixture of wash water and compressed air is applied through nozzle 52 causing the textile material to be propelled through the rope return conduit 56. The compressed air aids the propulsion of the rope R and reduces the required wash water volume, as the amount of water sufficient to thoroughly wash the cloth rope R is less than the amount of water necessary to propel the cloth rope R through the treatment chamber 35. Once the wash water has been used, it is drained through drain pipe 40 and is not recirculated. In this manner, more efficient washing can be achieved than with the previous methods utilizing a recirculation process. Dye or other treatment liquid may also be washed from the inner walls of the pressure vessel 34 by introducing wash water through fittings 50 in the pressure vessel 34.

Figure 17:
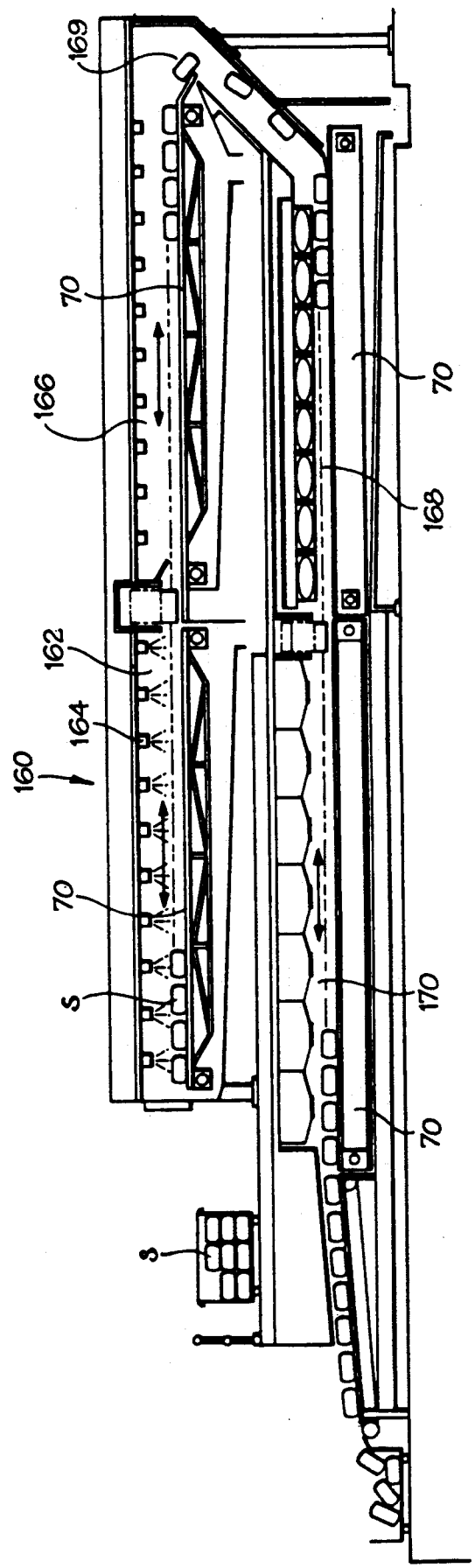
FIG. 17 is an elevational view of an apparatus for low liquid wet treatment of skeins according to an alternative embodiment of the present invention.

In an alternative embodiment of the present invention, a textile yarn skein treating apparatus 160 is shown generally in FIG. 17. The skein treatment apparatus 160 is a four chambered apparatus having two upper chambers 162,166 and two lower chambers 168,170 directly below the upper chambers 162,166. The skeins are initially loaded into a dyeing chamber 162 where dyeing or other treatment liquid is provided through nozzles 164. Skein support members 70 operate similar to the operation of the support members 70 in the preferred embodiment of the present invention except that they periodically reverse direction to reciprocate the skeins for enhanced treatment. At the end of each treatment stage, the skeins are advanced from one chamber to the next or unloaded at the exit chamber 170. The skeins thus progress in sequence through the dyeing chamber 162, a washing chamber 166, a downwardly directed transport chute 169, and a drying chamber 170. After the drying chamber 170 the skeins are unloaded from the skein treating apparatus 160.

Figure 18:
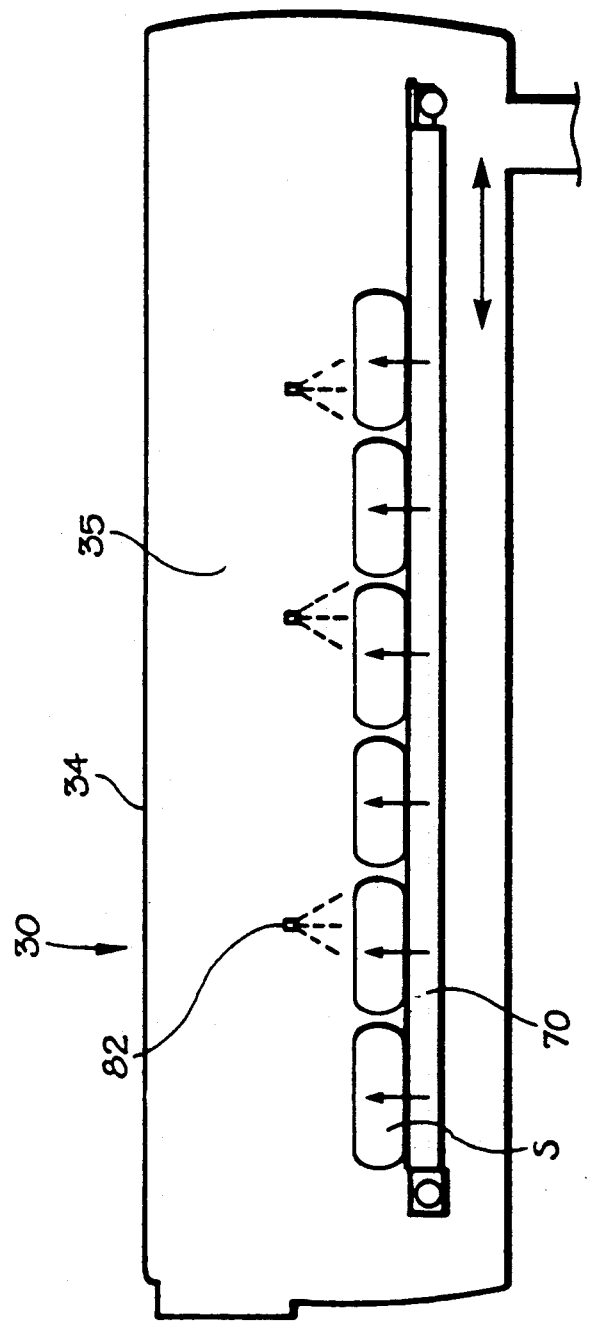
FIG. 18 is a schematic elevational view of an apparatus for low liquid wet treatment of a textile material in skein form illustrating the application of treatment liquid through the skein support members thereof.

In an alternate embodiment of the present invention as seen in FIG. 18, the support members 70 of the skein treating apparatus 160 are provided with an arrangement for circulating treatment liquid thereinto and are provided with apertures formed in the upper surfaces thereof for applying treatment liquid to skeins supported and moved thereon. The sinusoidal movement of the support members 70 along with the application of treatment liquid from below enhances the relaxation of skeins for proper bulking thereof as well as provide enhanced dyeing reliability.

Figure 19:
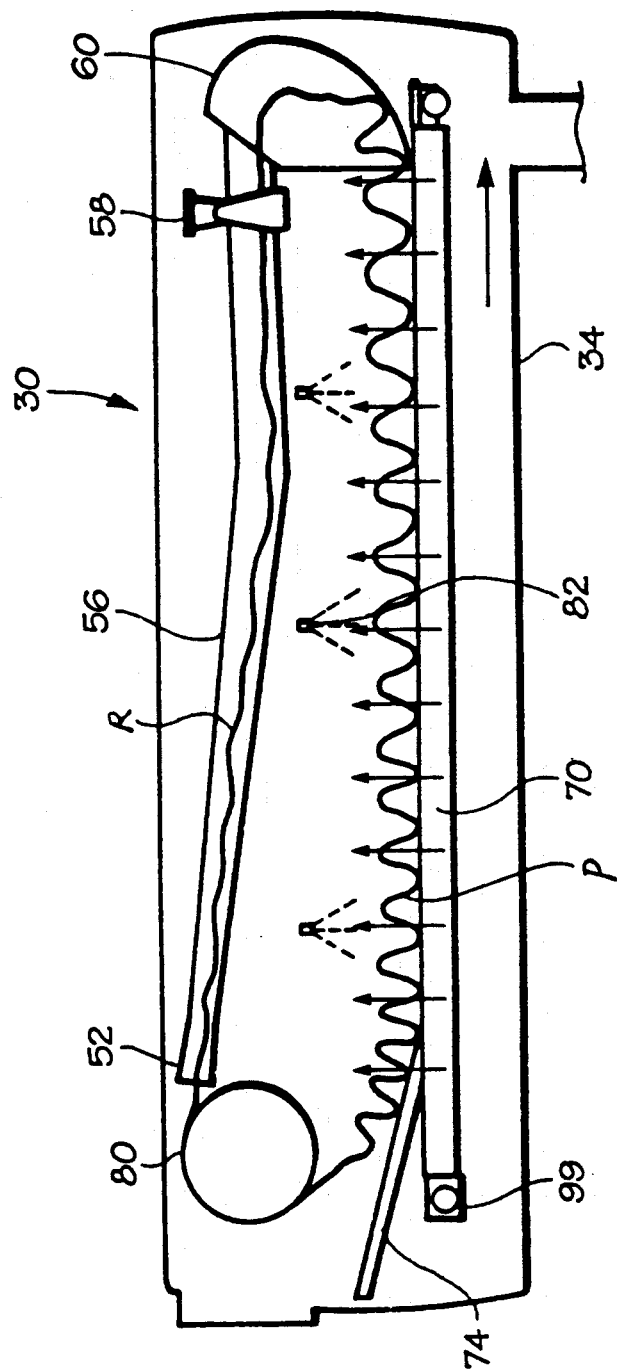
FIG. 19 is a schematic elevational view of an apparatus for low liquid wet treatment of a textile material in endless rope form according to an alternative embodiment of the present invention wherein treatment liquid is applied through the plug support members.

As seen in FIG. 19, the support members 70 of the cloth rope dyeing apparatus 30 may also be provided with apertures therein and an arrangement for circulating treatment liquid thereto for applying treatment liquid upwardly into the plug from the support members 70.

It should be noted that while the present invention has particular merit in use to treat textile material wholly above and without a dye bath, the invention has applications as well to support and move textile material at least partially submerged in a dye bath provided, however, that the dye bath is not at a high enough level to create sufficient buoyancy of the plug to lose advancing traction with the support members 70 or otherwise interfere with movement of the textile material through the system.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention o otherwise to exclude any such other embodiments, adaptations, variations, modifications and equivalent arrangements, the present invention being limited only by the claims appended hereto and the equivalents thereof.

I claim:

1. An apparatus for low liquid wet treatment of a textile material comprising:
   a vessel having a treatment chamber for containing the material;
   means for applying treatment liquid to the material; and
   means for supporting and moving the material in said treatment chamber including a plurality of movable support members and means for driving said movable support members in a material supporting and moving path in which said movable support members support and move the material supported thereon and in a return path below said material supporting and moving path in which said movable support members move without moving the material, said driving mans cyclically raising said movable support members from the return path to the material supporting and moving path for material advancing movement of the movable support members therealong and lowering the movable support members from the material supporting and moving path to the return path for return movement of the movable support members therealong.

2. An apparatus for low liquid wet treatment of a textile material according to claim 1 wherein said support members are narrow elongated members extending in parallel relation in said treatment chamber.

3. An apparatus for low liquid wet treatment of a textile material according to claim 2 wherein said drive means includes means connecting said drive means to said support members in a loose fit accommodating a limited freedom of movement of said support members.

4. An apparatus for low liquid wet treatment of a textile material according to claim 3, wherein said connecting means comprises retaining tubes secured to one of said support members and said drive means and rods extending from the other of said support members and said drive means and loosely fitting in said retaining tubes.

5. An apparatus for low liquid wet treatment of a textile material according to claim 1 wherein said support members are arranged in a row and said driving means moves alternate support members through said supporting and moving path while moving intermediate support members through said return path.

6. An apparatus for low liquid wet treatment of a textile material according to claim 1 wherein said driving means imparts an oscillating motion to said support members for moving said support members through said supporting and moving path and through said return path.

7. An apparatus for low liquid wet treatment of a textile material according to claim 1 wherein said driving means is operable to periodically reverse the direction of movement of said support members in said paths.

8. An apparatus for low liquid wet treatment of a textile material according to claim 1 and further comprising means for circulating treatment liquid from said treatment chamber to said means for applying treatment liquid to the material while maintaining a low level of liquid in the bottom of the vessel generally below a level at which the liquid would impede the advancement of the material by said support members.

9. An apparatus for low liquid wet treatment of a textile material according to claim 1 wherein said support members include means for applying treatment liquid to said material being supported and moved thereon.

10. An apparatus for low liquid wet treatment of a textile material according to claim 9 wherein said means for applying treatment liquid to the material includes hollow interiors in said support members for passage of treatment liquid therethrough and a plurality of liquid dispensing openings in said support members facing the material supported in the support members to direct the treatment liquid onto the supported material.

11. An apparatus for low liquid wet treatment of a textile material according to claim 1 wherein said means for applying treatment liquid to the material in said treatment chamber includes spray means for directing at least a portion of the treatment liquid into said treatment chamber at a plurality of openings within said treatment chamber above the material to apply treatment liquid to the material at a plurality of locations as the material progresses through said treatment chamber, said openings being disposed and shaped for distribution of said treatment liquid across substantially the full width of the material.

12. An apparatus for low liquid wet treatment of a textile material according to claim 11 wherein said openings are arranged in pairs, each pair including laterally opposed openings for dispensing liquid in intersecting streams.

13. An apparatus for low liquid wet treatment of a textile material according to claim 1 wherein said vessel is generally longitudinally extending for travel of the textile material in a predetermined path therethrough and said means for supporting and moving the material supports and advances the material through said treatment chamber with said supporting and moving path being an advancing path.

14. An apparatus for low liquid wet treatment of a textile material in endless rope form comprising:
 a generally longitudinally extending vessel for circulating the rope in a predetermined path therethrough, said vessel having a treatment chamber for travel of the rope therethrough;
 means for forming the rope in plug form for travel through said treatment chamber in plug form;
 means for withdrawing the rope from the plug in said treatment chamber;
 a rope return conduit for returning the rope from said withdrawal means to said plug forming means;
 means for imparting a moving force to the tope for travel through said rope return conduit;
 means for applying treatment liquid to the plug; and
 means for supporting and advancing the plug through said treatment chamber including a plurality of plug support members and means for driving said plug support members through an advancing path in which said plug support members support and advance said plug supported thereon and through a return path below said advancing path in which said plug support members are out of advancing engagement with said plug.

15. An apparatus for low liquid wet treatment of a textile material in endless rope form according to claim 14 wherein said plug support members are narrow elongated members extending in parallel relation in said treatment chamber.

16. An apparatus for low liquid wet treatment of a textile material according to claim 15 wherein said plug support members are inclined slightly upwardly in the direction of plug advance.

17. An apparatus for low liquid wet treatment of a textile material in endless rope form according to claim 14 wherein said support members are arranged in a row and said driving means moves alternate plug support members through said advancing path while moving intermediate plug support members through said return path.

18. An apparatus for low liquid wet treatment of a textile material in endless rope form according to claim 17 wherein said driving means imparts an oscillating motion to said plug support members for moving said plug support members through said advancing path and through said return path.

19. An apparatus for low liquid wet treatment of a textile material in endless rope form according to claim 14 wherein said driving means is operable to periodically reverse the direction of movement of the support members in said paths.

20. An apparatus for low-liquid wet treatment of a textile material in endless rope form according to claim 14 wherein each plug support member includes a discharge end portion inclined substantially upwardly relative to the adjacent portion of the support member to position the plug at an upward disposition to facilitate withdrawal of the endless rope from the plug by said withdrawal means.

21. An apparatus for low liquid wet treatment of a textile material in endless rope form according to claim 14 wherein said means for directing treatment liquid against the rope includes jet means located generally at the entrance of said rope return conduit for applying treatment liquid and imparting a moving force to the rope.

22. An apparatus for low liquid wet treatment of a textile material in endless rope form according to claim 21 wherein said jet means includes means for applying water to the rope through said jet means to wash the rope and propel the rope through said rope return conduit.

23. An apparatus for low liquid wet treatment of a textile material in endless rope form according to claim 22 wherein said washing means to wash the rope includes means for applying air to the rope in conjunction with the water to propel the rope at a sufficient speed for washing while conserving water during said washing.

24. An apparatus for low liquid wet treatment of a textile material in endless rope form according to claim 14 and further comprising means for circulating treatment liquid from said treatment chamber to said means for directing treatment liquid against the rope and to said means for applying treatment liquid to the plug while maintaining a low level of liquid in the bottom of the vessel generally below a level at which the liquid would impede the advancement of the plug by said plug support members.

25. An apparatus for low liquid wet treatment of a textile material in endless rope form according to claim 14 wherein said means for applying treatment liquid to the plug includes spray means for directing at least a portion of the treatment liquid into said treatment chamber at a plurality of openings spaced along the length of said chamber intermediate its ends and above the plug to apply treatment liquid to said plug at a plurality of locations as the plug progresses through said treatment chamber, said openings being disposed and shaped for distribution of said treatment liquid across substantially the full width of the rope plug.

26. An apparatus for low liquid wet treatment of a textile material according to claim 25 wherein said openings are arranged in pairs, each pair including laterally opposed openings for dispensing liquid widthwise of the chamber in intersecting streams.

27. An apparatus for low liquid wet treatment of a textile material in endless rope form according to claim 14 wherein said rope return conduit includes an opening into said plug forming chamber and an end portion that is movable traversely in an oscillating manner to effect plating of the rope in said plug forming chamber.

28. An apparatus for low liquid wet treatment a textile material in endless rope form according to claim 14 wherein said rope return conduit has an upstream portion and a downstream portion at an upward inclination with respect thereto to cause the treating liquid and the cloth rope propelled thereby to spread laterally at the juncture of the portions and thereby present the cloth rope for enhanced plug formation in plug forming chamber.

29. An apparatus for low liquid wet treatment of a textile material according to claim 14 wherein said rope return conduit includes an opening into said plug forming chamber, and a baffle plate disposed at said opening for deflecting the endless rope into said plug forming chamber.

30. An apparatus for low liquid wet treatment of a textile material according to claim 29 said baffle plate is pivotally mounted for pivoting to adjust the deflection of the endless rope.

31. An apparatus for low liquid wet treatment of a textile material in endless rope form according to claim 14 wherein said plug forming chamber has a plurality of apertures formed therein for drainage of the treatment liquid therethrough during plug formation and to thereby minimize interference with plug formation.

32. An apparatus for low liquid wet treatment of a textile material in endless rope form according to claim 14 wherein said plug forming chamber includes an outer wall portion extending generally horizontally into said treatment chamber below the rope plug and above said plug support members to direct the rope in plug form onto said plug support members.

33. An apparatus for low liquid wet treatment of a text material in endless rope form according to claim 14 and further comprising:

means for applying wash water to said textile material to wash said textile material after treatment thereof and to propel said textile material through said treatment chamber during washing thereof;

means for injecting compressed air into said wash water for utilization of compressed air to aid in the propulsion of the textile material through said treatment chamber with a minimum of wash water; and means for draining wash water from said vessel without recirculation thereof.

34. An apparatus for low liquid wet treatment of a textile material according to claim 1 wherein said driving means moves some of said members through their material supporting and moving path while other members are being moved through their return path.

35. An apparatus for low liquid wet treatment of a textile material in endless rope form according to claim 14 wherein said driving means moves some of said plug support members through their advancing path while moving other plug support members through their return path.

* * * * *

UNITED STATES PATENT AND TRADEMARK OFFICE
CERTIFICATE OF CORRECTION

PATENT NO. : 5,235,828

DATED : August 17, 1993

INVENTOR(S) : Christoph W. Aurich, Charles R. Hornbuckle, William C. Sturkey It is certified that error appears in the above-identified patent and that said Letters Patent is hereby corrected as shown below:

Column 1, line 24, delete "a" and insert therefor -- an --.

Column 1, line 45, delete "clot" and insert therefor -- cloth --.

Column 6, line 12, after "FIG. 1" insert -- ; --.

Column 6, line 58, delete "tee" and insert therefor -- the --.

Column 8, line 18, delete "6;" and insert therefor -- 61 --.

Column 9, line 28, delete "f" and insert therefor -- of --.

Column 10, line 14, delete "this" and insert therefor -- the --.

Column 10, line 38, delete "yolk" and insert therefor -- yoke --.

Column 10, line 49, delete "yolk" and insert therefor -- yoke --.

Column 10, line 52, delete "yolk" and insert therefor -- yoke --.

Column 10, line 52, delete "i" and insert therefor -- is --.

Column 10, line 53, delete "yolk" and insert therefor -- yoke -- (both occurrences).

Column 10, line 55, delete "yokes" and insert therefor -- yoke --.

Column 10, line 61, delete "yokes" and insert therefor -- yoke --.

Column 10, line 63, delete "yokes" and insert therefor -- yoke --.

UNITED STATES PATENT AND TRADEMARK OFFICE
CERTIFICATE OF CORRECTION

PATENT NO. : 5,235,828

DATED : August 17, 1993

INVENTOR(S) : Christoph W. Aurich, Charles R. Hornbuckle, William C. Sturkey It is certified that error appears in the above-identified patent and that said Letters Patent is hereby corrected as shown below:

Column 10, line 64, delete "yolk" and insert therefor -- yoke --.

Column 10, line 67, delete "12" and insert therefor -- 126 --.

Column 10, line 68, delete "yolk" and insert therefor -- yoke --.

Column 11, line 1, delete "yolk" and insert therefor -- yoke --.

Column 11, line 2, delete "yolk" and insert therefor -- yoke --.

Column 11, line 2, delete "cause" and insert therefor -- causes --.

Column 11, line 3, delete "yolk" and insert therefor -- yoke --.

Column 12, line 38, delete "15" and insert therefor -- 151 --.

Column 13, line 15, after "R" insert -- to --.

Column 14, line 56, after "170" insert -- , --.

Column 15, line 33, delete "o" and insert therefor -- or --.

Column 15, line 38, delete "I" and insert therefor -- We --.

Column 15, line 54, delete "mans" and insert therefor -- means --.

Column 17, line 16, delete "tope" and insert therefor -- rope --.

Column 18, line 11, delete "washing".

Column 18, line 50, after "treatment" insert -- of --.

UNITED STATES PATENT AND TRADEMARK OFFICE
CERTIFICATE OF CORRECTION

PATENT NO. : 5,235,828

DATED : August 17, 1993

INVENTOR(S) : Christoph W. Aurich, Charles R. Hornbuckle, William C. Sturkey

It is certified that error appears in the above-identified patent and that said Letters Patent is hereby corrected as shown below:

Column 18, line 57, after "in" insert -- said --.

Column 18, line 66, after "29" insert -- wherein --.

Signed and Sealed this

Twenty-sixth Day of July, 1994

Attest:

BRUCE LEHMAN

*Attesting Officer*    *Commissioner of Patents and Trademarks*